United States Patent
Li et al.

(10) Patent No.: US 12,469,179 B2
(45) Date of Patent: Nov. 11, 2025

(54) SYSTEM AND METHODS FOR UPSAMPLING OF DECOMPRESSED DATA AFTER LOSSY COMPRESSION USING A NEURAL NETWORK

(71) Applicant: AtomBeam Technologies Inc., Moraga, CA (US)

(72) Inventors: Zhu Li, Overland Park, KS (US); Brian R. Galvin, Silverdale, WA (US)

(73) Assignee: ATOMBEAM TECHNOLOGIES INC., Moraga, CA (US)

(*) Notice: Subject to any disclaimer, the term of this patent is extended or adjusted under 35 U.S.C. 154(b) by 0 days.

(21) Appl. No.: 18/679,515

(22) Filed: May 31, 2024

(65) Prior Publication Data
US 2025/0191231 A1   Jun. 12, 2025

Related U.S. Application Data

(63) Continuation-in-part of application No. 18/537,728, filed on Dec. 12, 2023, now Pat. No. 12,058,333.

(51) Int. Cl.
*G06T 9/00* (2006.01)

(52) U.S. Cl.
CPC .............. *G06T 9/001* (2013.01); *G06T 9/002* (2013.01)

(58) Field of Classification Search
CPC .................................................... G06T 9/002
USPC ..................................................... 375/240.01
See application file for complete search history.

(56) References Cited

U.S. PATENT DOCUMENTS

| | | |
|---|---|---|
| 4,003,054 A | 1/1977 | Goldstone |
| 4,780,718 A | 10/1988 | Hudson et al. |
| 4,924,229 A | 5/1990 | Eichel et al. |
| 5,504,455 A | 4/1996 | Inkol |
| 5,708,436 A | 1/1998 | Loiz et al. |
| 7,411,540 B1 | 8/2008 | Lopez et al. |
| 7,598,899 B2 | 10/2009 | Allen et al. |
| 7,629,922 B2 | 12/2009 | Winstead et al. |
| 7,876,257 B2 | 1/2011 | Vetro et al. |
| 7,999,724 B2 | 8/2011 | Cho |
| 8,681,037 B2 | 3/2014 | Doria |
| 10,095,635 B2 | 10/2018 | Abbas et al. |
| 11,255,960 B2 | 2/2022 | Kolouri et al. |

(Continued)

FOREIGN PATENT DOCUMENTS

| | | |
|---|---|---|
| EP | 3364212 A1 | 8/2018 |
| GB | 2620921 A | 1/2024 |
| WO | 2020104416 A1 | 5/2020 |

*Primary Examiner* — Jeffery A Williams

(74) *Attorney, Agent, or Firm* — Galvin Patent Law LLC; Brian R Galvin

(57) ABSTRACT

A system and method for Light Detection and Ranging (LIDAR) image compression integrates AI-based techniques to enhance compression quality. It incorporates a novel AI deblocking network composed of convolutional layers for feature extraction and a channel-wise transformer with attention to capture complex inter-channel dependencies. The convolutional layers extract multi-dimensional features from the LIDAR, while the channel-wise transformer learns global inter-channel relationships. This hybrid approach addresses both local and global features, mitigating compression artifacts and improving image quality. The model's outputs enable effective LIDAR image reconstruction, achieving advanced compression while preserving crucial information for accurate analysis.

14 Claims, 16 Drawing Sheets

(56) References Cited

U.S. PATENT DOCUMENTS

| | | |
|---|---|---|
| 11,656,353 B2 | 5/2023 | Li et al. |
| 2004/0017307 A1 | 1/2004 | Cirillo et al. |
| 2004/0160353 A1 | 8/2004 | Cirillo et al. |
| 2008/0231504 A1 | 9/2008 | Sartor et al. |
| 2011/0012778 A1 | 1/2011 | Nguyen et al. |
| 2015/0054678 A1 | 2/2015 | Wakayama |
| 2017/0048537 A1 | 2/2017 | Boufounos et al. |
| 2020/0258296 A1 | 8/2020 | Pennings et al. |
| 2021/0255304 A1 | 8/2021 | Fontijne et al. |
| 2022/0099837 A1* | 3/2022 | Crouch ................ G01S 13/931 |
| 2022/0404490 A1 | 12/2022 | Evans et al. |
| 2023/0169623 A1 | 6/2023 | Chen et al. |
| 2023/0184927 A1 | 6/2023 | Chen et al. |

* cited by examiner

SYSTEM AND METHODS FOR UPSAMPLING OF DECOMPRESSED DATA AFTER LOSSY COMPRESSION USING A NEURAL NETWORK

CROSS-REFERENCE TO RELATED APPLICATIONS

Priority is claimed in the application data sheet to the following patents or patent applications, each of which is expressly incorporated herein by reference in its entirety: Ser. No. 18/537,728

BACKGROUND OF THE INVENTION

Field of the Art

The present invention is in the field of data compression, and more particularly is directed to the problem of recovering data lost from lossy compression and decompression.

Discussion of the State of the Art

For many applications, such as video compression for streaming video, lossy compression techniques such as HEVC (high-efficiency video coding) to optimize the use of available bandwidth and for other purposes. By definition, lossy compression involves the loss of some of the data being transmitted in the process of compression; in the video compression example, this results in lower-resolution video and provides the reason for pixelated video in low-bandwidth situations. Clearly it would be desirable to recover as much of the lost data as possible, but of course this is impossible in a single compressed channel for the method of compression results in a true loss of information.

LIDAR (Light Detection and Ranging) is a remote sensing technology that uses laser pulses to measure distances and create detailed 3D representations of objects, structures, and landscapes. It works by emitting laser pulses and measuring the time it takes for the light to bounce back from the target, allowing for precise distance calculations. LIDAR systems can be mounted on various platforms, including aircraft, drones, and ground-based vehicles, enabling the collection of high-resolution spatial data. The technology finds applications in a wide range of fields, such as mapping and surveying, autonomous vehicles, forestry and environmental monitoring, archaeology, and urban planning. LIDAR data is used to create digital elevation models, generate 3D point clouds, detect and classify objects, and extract valuable information about the physical characteristics of the scanned environment. With its ability to provide accurate and detailed measurements, even in challenging conditions, LIDAR has revolutionized the way we capture, analyze, and understand the world around us.

LIDAR imaging generates 3D point clouds by measuring the time-of-flight (ToF) and intensity of laser pulses reflected from the scanned environment. Each point in the LIDAR point cloud is characterized by its spatial coordinates (x, y, z) and an associated intensity value representing the reflectance strength of the returned laser pulse. Single channel LIDAR data storage is a common approach used in many LIDAR systems, where each laser pulse results in a single range measurement and intensity value. The captured data is typically stored as a stream or list of 3D coordinates (x, y, z) along with the corresponding intensity values, forming a dense point cloud representation of the scanned environment. This straightforward data structure allows for efficient storage and processing, making it suitable for a wide range of applications such as topographic mapping, forestry, autonomous vehicles, and industrial metrology. LIDAR range and intensity can be calculated using the following equations:

$$\text{Range} = \frac{(c * ToF)}{2}$$

$$\text{Intensity} = \frac{(Pr * C)}{\text{Range}^2}$$

Pr is the power of the received laser pulse and C is a calibration constant that depends on the LIDAR system and its parameters.

Single channel LIDAR data can be quite large, especially when capturing high-resolution and dense point clouds over large areas. The size of the data depends on several factors, including the number of points captured per unit area, the spatial extent or coverage area of the survey, the inclusion of additional attributes such as intensity and timestamp, and the data format used for storage. Large-scale LIDAR datasets covering entire cities or regions can easily reach tens or hundreds of gigabytes, or even terabytes, in size. To handle and process such large datasets efficiently, specialized software tools and data management systems are employed, providing capabilities for data compression, spatial indexing, streaming, and parallel processing to enable efficient storage, retrieval, and analysis of massive LIDAR point clouds.

The preservation of LIDAR image quality using lossless compression methods is generally inefficient in terms of storage and transmission. Lossless compression techniques aim to reduce the file size without losing any information, but the achievable compression ratios are limited due to the high variability and noise in LIDAR data. The high entropy or information content of LIDAR data makes it challenging for lossless algorithms to find significant redundancies and patterns, resulting in limited compression ratios. Even with lossless compression, the file sizes of LIDAR datasets can still be substantial, posing challenges for storage, transmission, and processing, especially when dealing with large-scale surveys. Additionally, lossless compression algorithms often require more computational resources compared to lossy methods, impacting the efficiency of data processing pipelines and real-time applications. To address these limitations, lossy compression techniques are often employed, sacrificing some data fidelity for higher compression ratios while maintaining an acceptable level of data quality for many applications.

Lossy compression techniques result in artifacts appearing in the decompressed image data. The severity and prevalence of these artifacts depend on factors such as the compression algorithm, compression ratio, nature of the LIDAR data, and scene characteristics. Common lossy data compression techniques for single channel LIDAR image data include quantization, where the range and intensity values are mapped to a reduced set of discrete levels; block-based compression, such as JPEG, which divides the data into blocks and applies compression to each block independently; and wavelet-based compression, which decomposes the data into different frequency bands and discards or quantizes the less significant coefficients. Other techniques like point cloud compression algorithms (e.g., octree-based compression) and adaptive compression methods that adjust the compression parameters based on the data characteristics are also used. However, these lossy compression techniques have drawbacks, such as the introduction of artifacts like quantization noise, blocking effects, ringing, blurring, and reduced data fidelity. The loss of information during compression can impact the accuracy and quality of the LIDAR data, potentially affecting downstream applications like object detection, classification, and measurements. Additionally, they are limited in real-time processing (such as is required during autonomous vehicle operation) as existing systems might not be able to compress and decompress complex-value data quickly enough for time sensitive applications.

What is needed is a system and methods for upsampling of decompressed data after lossy compression using a neural network.

SUMMARY OF THE INVENTION

Accordingly, the inventor has conceived and reduced to practice, a system and methods for upsampling of decompressed data after lossy compression using a neural network that integrates AI-based techniques to enhance compression quality. It incorporates a novel Attention Convolutional neural network based deblocking network composed of convolutional layers for feature extraction and a channel-wise transformer with attention to capture complex inter-channel dependencies. The convolutional layers extract multi-dimensional features from the single channel LIDAR images, while the channel-wise transformer network learns global inter-channel relationships. This hybrid approach addresses both local and global features, mitigating compression artifacts and improving image quality. The model's outputs enable effective LIDAR image reconstruction, achieving advanced compression while preserving crucial information for accurate analysis.

According to a preferred embodiment, a system for single channel LIDAR data compression is disclosed, comprising a computing device with at least a memory and a processor; a trained deep learning algorithm configured to recover range and intensity information associated with a LIDAR point cloud; and a decoder comprising a first plurality of programming instructions stored in the memory and operable on the processor. When operating on the processor, the first plurality of programming instructions cause the computing device to: receive a compressed bit stream containing single channel LIDAR data; decode the compressed bit stream to predict a range channel and an intensity channel; and use both the range channel and the intensity channel as inputs into the trained deep learning algorithm to recover both range and intensity information associated with the LIDAR point cloud data. This system enables efficient compression and reconstruction of single channel LIDAR data while preserving the critical spatial and reflectance properties of the scanned environment.

According to another preferred embodiment, a method for single channel LIDAR data compression is disclosed, comprising the steps of: training a deep learning algorithm configured to recover range and intensity information associated with a LIDAR point cloud; receiving a compressed bit stream containing single channel LIDAR data; decoding the compressed bit stream to predict a range channel and an intensity channel; and using both the range channel and the intensity channel as inputs into the trained deep learning algorithm to recover both range and intensity information associated with the LIDAR point cloud data. This method enables the efficient compression and reconstruction of single channel LIDAR data, preserving the essential spatial and reflectance properties of the scanned environment while reducing storage and transmission requirements.

According to an aspect of an embodiment, the trained deep learning algorithm is a neural network.

According to an aspect of an embodiment, the trained deep learning algorithm further comprises a multi-channel transformer with attention.

According to an aspect of an embodiment, training the deep learning algorithm comprises two stages, wherein each stage comprises a specific loss function.

According to an aspect of an embodiment, the loss function is mean squared error.

According to an aspect of an embodiment, one stage of the two stages is associated with a loss function for the range channel.

According to an aspect of an embodiment, one stage of the two stages is associated a loss function for the intensity channel.

BRIEF DESCRIPTION OF THE DRAWING FIGURES

DETAILED DESCRIPTION OF THE INVENTION

Figure 1:
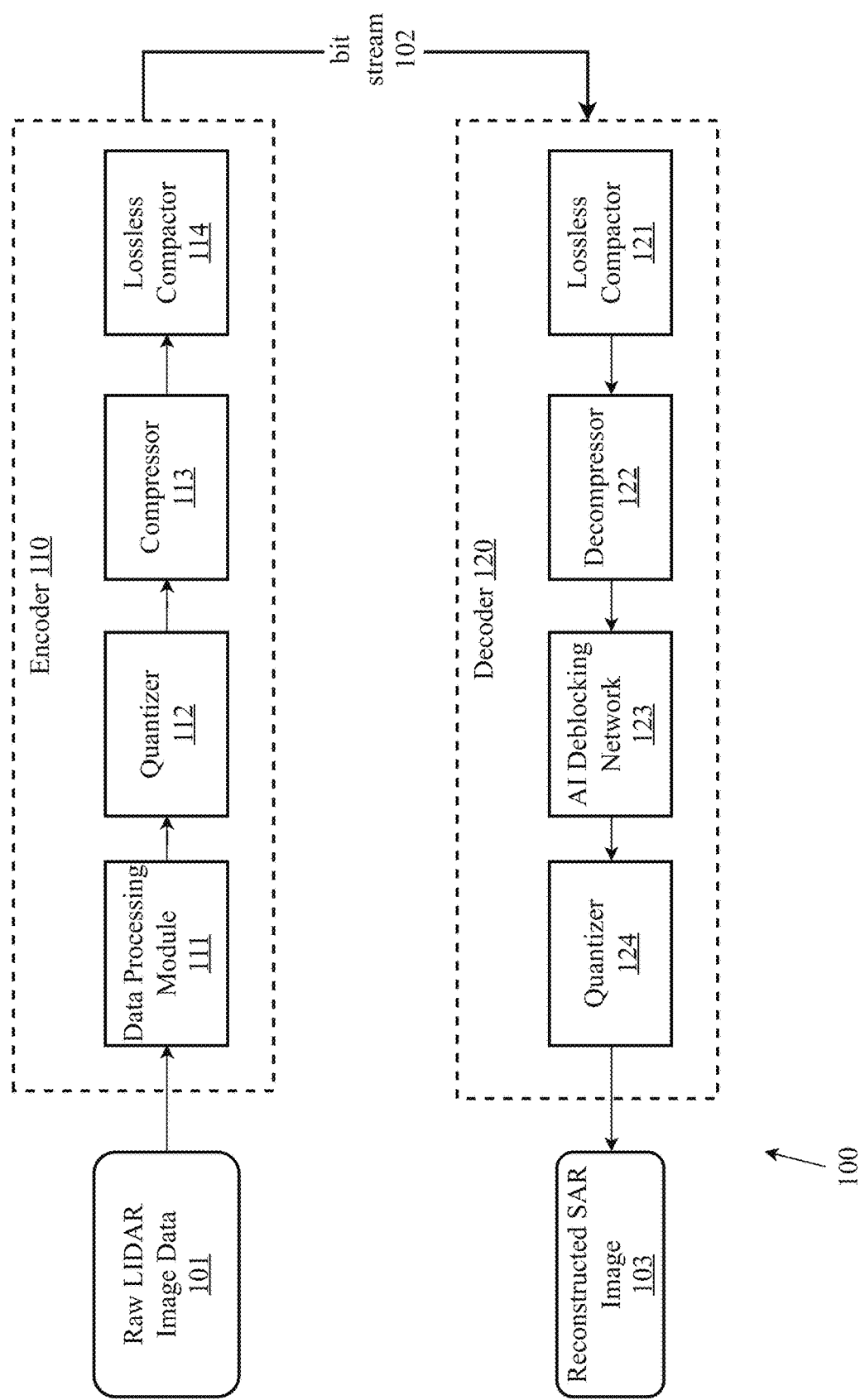
FIG. 1 is a block diagram illustrating an exemplary system architecture for LIDAR image compression with predictive recovery, according to an embodiment.

The inventor has conceived, and reduced to practice, a system and method for single channel LIDAR image compression which integrates AI-based techniques to enhance compression quality. It incorporates a novel AI deblocking network composed of convolutional layers for feature extraction and a channel-wise transformer with attention to capture complex inter-channel dependencies. The convolutional layers extract multi-dimensional features from the single channel LIDAR image, while the channel-wise transformer learns global inter-channel relationships. This hybrid approach addresses both local and global features, mitigating compression artifacts and improving image quality. The model's outputs enable effective LIDAR image reconstruction, achieving advanced compression while preserving crucial information for accurate analysis.

Light Detection and Ranging (LIDAR) technology is used to capture detailed 3D representations of the environment by emitting laser pulses and measuring their reflections. Unlike traditional grayscale images that use a single intensity value per pixel, LIDAR data is more complex. Each point in a LIDAR point cloud contains not just one value but a set of attributes, including range (distance) and intensity. The range represents the distance from the LIDAR sensor to the point of reflection, while the intensity represents the strength of the reflected laser signal. In the context of LIDAR, the range and intensity values at each point provide crucial information about the spatial structure and properties of the scanned environment. The range data allows for the creation of accurate 3D models and measurements of objects and surfaces, while the intensity data provides insights into the reflectivity and material properties of the targets. In a LIDAR point cloud, the intensity attribute indicates the strength of the laser reflection, essentially representing how strongly the laser pulse was reflected back from the surface. Higher intensity values usually correspond to more reflective or dense materials, such as metal or solid surfaces, while lower intensity values may indicate less reflective or transparent materials, such as vegetation or glass.

The rich information content of LIDAR point clouds stems from the precise measurement of laser pulse reflections. When laser pulses emitted by a LIDAR system hit various features in the environment, they are reflected back to the sensor. The time it takes for the laser pulse to travel from the sensor to the target and back, known as the time-of-flight, is used to calculate the range or distance to each point. The range information allows for the creation of detailed 3D representations of the scanned environment, capturing the spatial geometry and structure of objects and surfaces. In addition to range, LIDAR systems also measure the intensity of the reflected laser pulses. The intensity information provides insights into the reflectivity and material properties of the targets. Different materials and surfaces exhibit varying levels of reflectivity, which affects the strength of the returned laser signal. For example, highly reflective surfaces like metal or polished objects will result in higher intensity values, while less reflective surfaces like vegetation or matte surfaces will have lower intensity values. The combination of range and intensity information in LIDAR point clouds enables a comprehensive understanding of the scanned environment, allowing for accurate measurements, object detection, and material classification.

In LIDAR data, regions with high point density and consistent range and intensity values are likely to represent stable surfaces or structures. These areas exhibit a high level of detail and allow for accurate 3D reconstruction and object recognition. On the other hand, regions with low point density or significant variations in range and intensity values might indicate changes, irregularities, or occlusions in the scanned environment. These areas may be affected by factors such as sensor limitations, surface properties, or environmental conditions that impact the reliability and completeness of the LIDAR data. Analyzing the consistency and uniformity of LIDAR point clouds helps in understanding the quality and reliability of the data for various applications, such as 3D modeling, change detection, and feature extraction.

Single channel LIDAR data compression is important for data volume reduction, bandwidth and transmission efficiency, real-time applications, and archiving and retrieval. LIDAR point clouds can be large due to their high density and the inclusion of range and intensity information for each point. Compression helps reduce the storage and transmission requirements, making it more feasible to handle and process the data. When LIDAR data needs to be transmitted over limited bandwidth channels, such as in remote sensing or field data collection, compression can help optimize data transmission and minimize communication costs. Some LIDAR applications, such as autonomous navigation and real-time mapping, require fast processing. Compressed data can be processed more efficiently, enabling quicker decision-making and response times. Additionally, compressed LIDAR data takes up less storage space, making long-term archiving and retrieval more manageable, especially when dealing with large-scale LIDAR datasets covering extensive areas or time periods. Efficient compression techniques allow for the preservation of important information while reducing data size, facilitating data sharing, analysis, and visualization in various LIDAR-based applications.

According to various embodiments, a system is proposed which provides a novel pipeline for compressing and subsequently recovering LIDAR data using a prediction recovery framework that utilizes a conventional point cloud compression algorithm to encode the original LIDAR point cloud to a bitstream. In an embodiment, a lossless compaction method may be applied to the encoded bitstream, further reducing the size of the LIDAR data for both storage and transmission. Subsequently, the system decodes a prediction of the range and intensity channels and then recovers the spatial and reflectance information via a deep-learning based network to effectively remove compression artifacts and recover information of the LIDAR point cloud as part of the loss function in the training. The deep-learning based network may be referred to herein as an artificial intelligence (AI) decompression network. This AI-based approach enables the efficient compression and accurate reconstruction of single channel LIDAR data, preserving the important range and intensity information while minimizing data storage and transmission requirements.

Deblocking refers to a technique used to reduce or eliminate blocky artifacts that can occur in compressed images or videos. These artifacts are a result of lossy compression algorithms, such as JPEG for images or various video codecs like H.264, H.265 (HEVC), and others, which divide the image or video into blocks and encode them with varying levels of quality. Blocky artifacts, also known as "blocking artifacts," become visible when the compression ratio is high, or the bitrate is low. These artifacts manifest as noticeable edges or discontinuities between adjacent blocks in the image or video. The result is a visual degradation characterized by visible square or rectangular regions, which can significantly reduce the overall quality and aesthetics of the content. Deblocking techniques are applied during the decoding process to mitigate or remove these artifacts. These techniques typically involve post-processing steps that smooth out the transitions between adjacent blocks, thus improving the overall visual appearance of the image or video. Deblocking filters are commonly used in video codecs to reduce the impact of blocking artifacts on the decoded video frames.

According to various embodiments, the disclosed system and methods may utilize a LIDAR recovery network configured to perform data deblocking during the data decoding process. Range and intensity channels in LIDAR data exhibit a non-linear relationship, as the intensity values are dependent on the range and the reflectivity of the target surfaces. The LIDAR recovery network is designed to leverage the spatial and reflectance information present in the range and intensity channels to enhance the decoded LIDAR point cloud or image. In an embodiment, the LIDAR recovery network is a deep learned neural network. According to an aspect of an embodiment, the LIDAR recovery network utilizes residual learning techniques to effectively capture and restore the high-frequency details lost during compression. According to an aspect of an embodiment, the LIDAR recovery network comprises a channel-wise transformer with attention mechanisms to adaptively weight the contributions of different channels based on their relevance to the deblocking process. According to an aspect of an embodiment, the LIDAR recovery network incorporates Multi-Scale Attention Blocks (MSAB) to capture and integrate information from different spatial scales, enabling more effective artifact reduction and detail preservation in the decompressed LIDAR data.

A channel-wise transformer with attention is a neural network architecture that combines elements of both the transformer architecture and channel-wise attention mechanisms. It's designed to process multi-channel LIDAR data, where each channel corresponds to a specific attribute such as range or intensity. The transformer architecture is a powerful neural network architecture initially designed for natural language processing (NLP) tasks. It consists of self-attention mechanisms that allow each element in a point cloud to capture relationships with other elements, regardless of their spatial position. The transformer has two main components: the self-attention mechanism (multi-head self-attention) and feedforward neural networks (position-wise feedforward layers). Channel-wise attention, also known as "Squeeze-and-Excitation" (SE) attention, is a mechanism commonly used in convolutional neural networks (CNNs) to model the interdependencies between channels (attribute maps) within a single layer. It assigns different weights to different channels to emphasize important channels and suppress less informative ones. At each layer of the network, a channel-wise attention mechanism is applied to the input LIDAR data. This mechanism captures the relationships between different channels (e.g., range and intensity) within the same layer and assigns importance scores to each channel based on its contribution to the overall representation. After the channel-wise attention, a transformer-style self-attention mechanism is applied to the output of the channel-wise attention. This allows each channel to capture dependencies with other channels in a more global context, considering the spatial relationships within the LIDAR point cloud. Following the transformer self-attention, feedforward neural network layers (position-wise feedforward layers) can be applied to further process the transformed LIDAR data, enabling the network to learn more complex representations and relationships between the range and intensity information.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "codebook" refers to a database containing sourceblocks each with a pattern of bits and reference code unique within that library. The terms "library" and "encoding/decoding library" are synonymous with the term codebook.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data set" refers to a grouping of data for a particular purpose. One example of a data set might be a word processing file containing text and formatting information. Another example of a data set might comprise data gathered/generated as the result of one or more radars in operation.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term "codeword" refers to the reference code form in which data is stored or transmitted in an aspect of the system. A codeword consists of a reference code to a sourceblock in the library plus an indication of that sourceblock's location in a particular data set.

The term "deblocking" as used herein refers to a technique used to reduce or eliminate blocky artifacts that can occur in compressed images or videos. These artifacts are a result of lossy compression algorithms, such as JPEG for images or various video codecs like H.264, H.265 (HEVC), and others, which divide the image or video into blocks and encode them with varying levels of quality. Blocky artifacts, also known as "blocking artifacts," become visible when the compression ratio is high, or the bitrate is low. These artifacts manifest as noticeable edges or discontinuities between adjacent blocks in the image or video. The result is a visual degradation characterized by visible square or rectangular regions, which can significantly reduce the overall quality and aesthetics of the content. Deblocking techniques are applied during the decoding process to mitigate or remove these artifacts. These techniques typically involve post-processing steps that smooth out the transitions between adjacent blocks, thus improving the overall visual appearance of the image or video. Deblocking filters are commonly used in video codecs to reduce the impact of blocking artifacts on the decoded video frames. A primary goal of deblocking is to enhance the perceptual quality of the compressed content, making it more visually appealing to viewers. It's important to note that deblocking is just one of many post-processing steps applied during the decoding and playback of compressed images and videos to improve their quality.

Conceptual Architecture

FIG. 1 is a block diagram illustrating an exemplary system architecture 100 for LIDAR image compression with predictive recovery, according to an embodiment. According to the embodiment, the system 100 comprises an encoder module 110 configured to receive as input raw LIDAR image data 101 and compress and compact the input data into a bitstream 102, and a decoder module 120 configured to receive and decompress the bitstream 102 to output a reconstructed LIDAR image data 103. In some embodiments, the LIDAR image data is stored as a 32-bit floating-point value, covering a range (e.g., full range −R to +R) that varies depending on the specific dataset.

A data processor module 111 may be present and configured to apply one or more data processing techniques to the raw input data to prepare the data for further processing by encoder 110. Data processing techniques can include (but are not limited to) any one or more of data cleaning, data transformation, encoding, dimensionality reduction, data slitting, and/or the like. In an embodiment, data processor 111 is configured to perform data clipping on the input data to a new range (e.g., cut range −C to +C). The selection of the new clipped range should be done such that only 1% of the total pixels in both I and Q channels are affected by the clipping action. Clipping the data limits the effect of extreme values while preserving the overall information contained in the LIDAR image.

After data processing, a quantizer 112 performs uniform quantization on the range and intensity channels. Quantization is a process used in various fields, including signal processing, data compression, and digital image processing, to represent continuous or analog data using a discrete set of values. It involves mapping a range of values to a smaller set of discrete values. Quantization is commonly employed to reduce the storage requirements or computational complexity of digital data while maintaining an acceptable level of fidelity or accuracy. In an embodiment, quantizer 112 receives the clipped range and intensity channels and quantizes them to 12 bits, thereby limiting the range from 0 to 4096. The result is a more compact representation of the data. According to an implementation, the quantized LIDAR data is then stored in a suitable format, such as LAS or LAZ, which is commonly used for LIDAR point cloud data. This formatted data is used as input to a compressor 113. Compressor 113 may be configured to perform data compression on the quantized range and intensity channels using a suitable point cloud compression algorithm. According to an embodiment, compressor 113 may utilize octree-based compression or other specialized techniques designed for efficient compression of LIDAR data. In such embodiments, a corresponding decompression algorithm may be used at a decompressor 122 at decoder 120.

The resulting encoded bitstream may then be (optionally) input into a lossless compactor 114 which can apply data compaction techniques on the received encoded bitstream. An exemplary lossless data compaction system which may be integrated in an embodiment of system 100 is illustrated with reference to FIG. 4-7. For example, lossless compactor 114 may utilize an embodiment of data deconstruction engine 501 and library manager 403 to perform data compaction on the encoded bitstream. The output of the compactor is a compacted bitstream 102 which can be stored in a database, requiring much less space than would have been necessary to store the raw 32-bit LIDAR image, or it can be transmitted to some other endpoint.

At the endpoint which receives the transmitted compacted bitstream 102, there may be a decoder module 120 configured to restore the compacted data into the original LIDAR image by essentially reversing the process conducted at encoder module 110. The received bitstream may first be (optionally) passed through a lossless compactor 121 which de-compacts the data into an encoded bitstream. In an embodiment, a data reconstruction engine 601 may be implemented to restore the compacted bitstream into its encoded format. The data reconstruction engine 601 plays a crucial role in the decoding process by ensuring the correct restoration of the compressed data. The encoded bitstream may flow from compactor 121 to decompressor 122, wherein a point cloud decompression technique may be used to decompress the encoded bitstream into the range/intensity channels. In an embodiment, decompressor 122 uses specialized point cloud decompression algorithms, such as octree-based decompression, to efficiently reconstruct the LIDAR data. It should be appreciated that lossless compactor components 114 and 121 are optional components of the system, and may or may not be present in the system, dependent upon the embodiment.

According to the embodiment, an Artificial Intelligence (AI) deblocking network 123 is present and configured to utilize a trained deep learning network to enhance a decoded LIDAR point cloud or image (i.e., range/intensity channels) as part of the decoding process. AI deblocking network 123 may leverage the non-linear relationship demonstrated between range and intensity information to enhance the reconstructed LIDAR data 103. Effectively, AI deblocking network 123 provides an improved and novel method for removing compression artifacts that occur during lossy compression/decompression using a network designed during the training process to simultaneously address the removal of artifacts and maintain fidelity of the range and intensity information by optimizing the balance between LIDAR data loss and range/intensity loss, ensuring a comprehensive optimization of the network during the training stages. The AI deblocking network takes into account the complex interplay between range and intensity, considering factors such as target reflectivity, incidence angle, and sensor characteristics, to effectively restore the original LIDAR data and preserve the accuracy of the measurements.

The output of AI deblocking network 123 may be dequantized by quantizer 124, restoring the range and intensity channels to their initial dynamic range. The dequantized LIDAR data may be reconstructed and output 103 by decoder module 120 or stored in a database for further processing or analysis. The reconstructed LIDAR data 103 represents the enhanced and artifact-reduced point cloud or image, which closely resembles the original LIDAR data captured by the sensor. This reconstructed data can be utilized in various applications, such as 3D modeling, mapping, object detection, and autonomous navigation, benefiting from the improved quality and fidelity provided by the AI deblocking network.

Figure 2A:
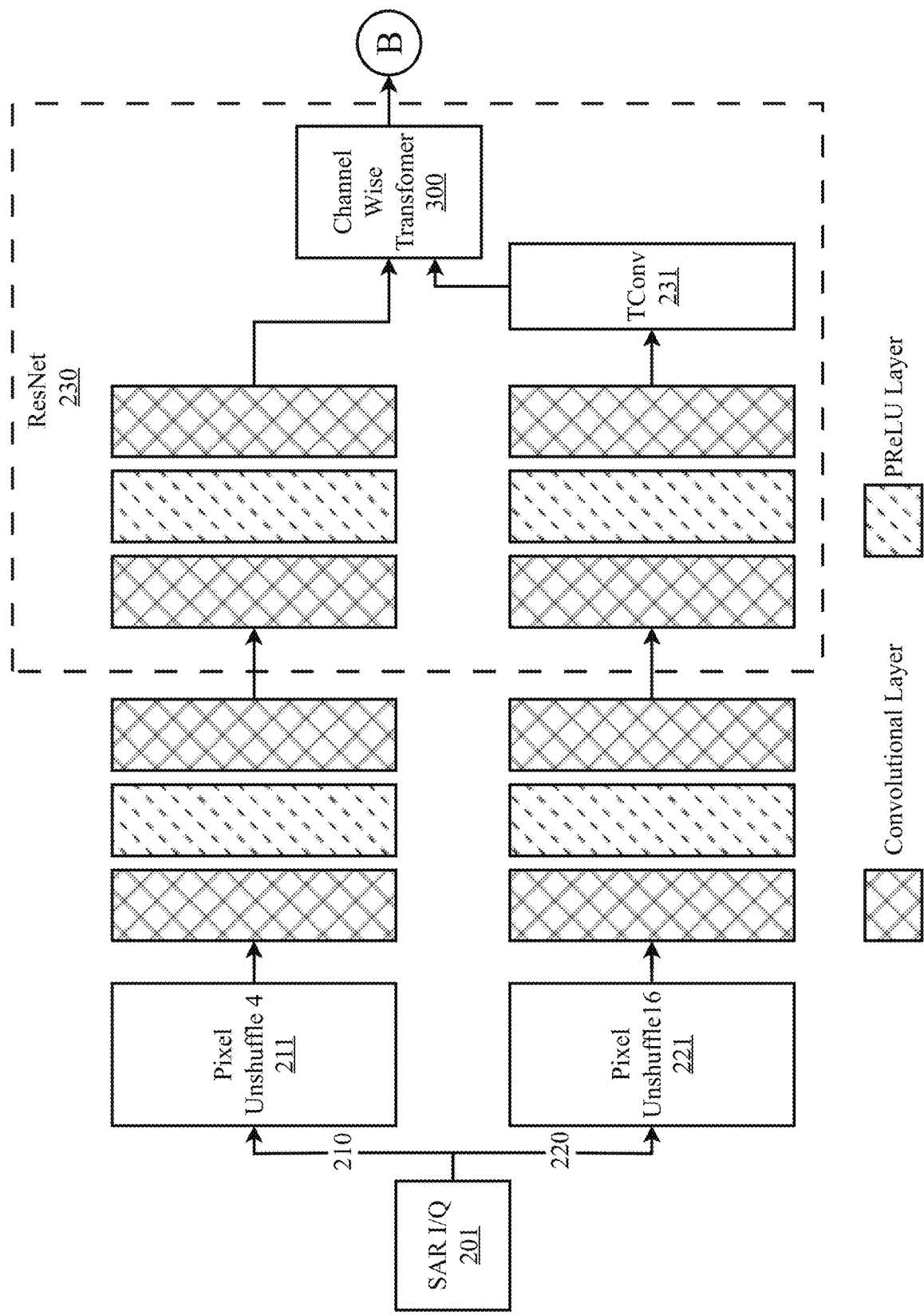
FIGS. 2A and 2B illustrate an exemplary architecture for an AI deblocking network configured to provide deblocking on dual-channel data stream comprising LIDAR R/I data, according to an embodiment.
Figure 2B:
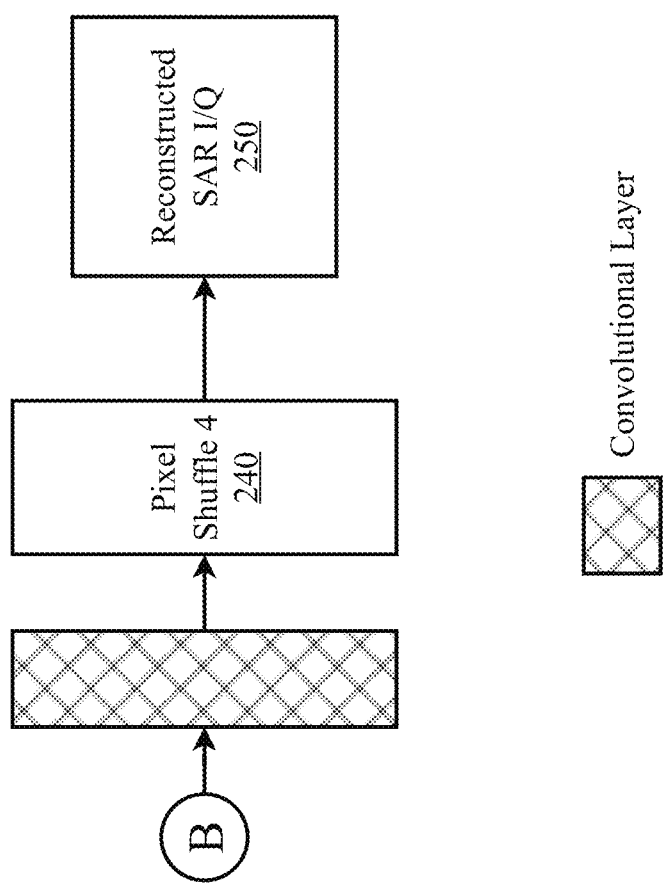

FIGS. 2A and 2B illustrate an exemplary architecture for an AI deblocking network configured to provide deblocking for dual-channel data stream comprising LIDAR range and intensity data, according to an embodiment. In the context of this disclosure, dual-channel data refers to the fact that LIDAR image signal can be represented as two (dual) components (i.e., range and intensity) which are correlated to each other in some manner. In the case of range and intensity, their correlation is based on the physical properties of the scanned environment, such as target reflectivity, distance, and incidence angle. AI deblocking network utilizes a deep learned neural network architecture for joint spatial and feature domain learning. According to the embodiment, a network may be developed for joint learning across one or more domains. As shown, the top branch 210 is associated with the spatial domain learning and the bottom branch 220 is associated with the feature domain learning. According to the embodiment, the AI deblocking network receives as input LIDAR image range and intensity channels 201 which, having been encoded via encoder 110, has subsequently been decompressed via decoder 120 before being passed to AI deblocking network for image enhancement via artifact removal. Inspired by the residual learning network and the MSAB attention mechanism, AI deblocking network employs resblocks that take two inputs. In some implementations, to reduce complexity the spatial resolution may be downsampled to one-half and one-fourth. During the final reconstruction the data may be upsampled to its original resolution. In one implementation, in addition to downsampling, the network employs deformable convolution to extract initial features, which are then passed to the resblocks. In an embodiment, the network comprises one or more resblocks and one or more convolutional filters. In an embodiment, the network comprises 8 resblocks and 64 convolutional filters.

Deformable convolution is a type of convolutional operation that introduces spatial deformations to the standard convolutional grid, allowing the convolutional kernel to adaptively sample input features based on the learned offsets. It's a technique designed to enhance the modeling of spatial relationships and adapt to object deformations in computer vision tasks. In traditional convolutional operations, the kernel's positions are fixed and aligned on a regular grid across the input feature map. This fixed grid can limit the ability of the convolutional layer to capture complex transformations, non-rigid deformations, and variations in object appearance. Deformable convolution aims to address this limitation by introducing the concept of spatial deformations. Deformable convolution has been particularly effective in tasks like object detection and semantic segmentation, where capturing object deformations and accurately localizing object boundaries are important. By allowing the convolutional kernels to adaptively sample input features from different positions based on learned offsets, deformable convolution can improve the model's ability to handle complex and diverse visual patterns.

According to an embodiment, the network may be trained as a two-stage process, each utilizing specific loss functions. During the first stage, a mean squared error (MSE) function is used in the range/intensity domain as a primary loss function for the AI deblocking network. The loss function of the LIDAR range/intensity channel LLIDAR is defined as:

$$L_{LIDAR} = \mathbb{E}[\|R - R_{pred}\|_2] + \mathbb{E}[\|I - I_{pred}\|_2]$$

Moving to the second stage, the network reconstructs the range and intensity components and computes the range and intensity loss using MSE as follows:

$$L_{range} = \mathbb{E}[\|R_{pred} - R_{dec}|_2]$$
$$L_{intensity} = \mathbb{E}[\|I_{pred} - I_{dec}|_2]$$

To calculate the overall loss, the network combines the LIDAR loss and the range/intensity loss, incorporating weighting factors, $\alpha$ and $\beta$, for the range and intensity losses, respectively. The total loss is computed as:

$$L_{total} = L_{LIDAR} + \alpha \times L_{range} + \beta \times L_{intensity}$$

The weighting factor values ($\alpha$ and $\beta$) may be selected based on the dataset used during network training. In an embodiment, the network may be trained using two different LIDAR datasets: the KITTI dataset and the Nuscenes dataset, both of which feature LIDAR point clouds with range and intensity information. In an embodiment, the weighting factors $\alpha$ and $\beta$ are set to 0.0001 and 0.0005, respectively, for the KITTI dataset, and 0.00005 and 0.0002, respectively, for the Nuscenes dataset. By integrating the LIDAR loss and the range/intensity losses in the total loss function, the system effectively guides the training process to simultaneously address the removal of artifacts and maintain the fidelity of the range and intensity information. The weighting factors, $\alpha$ and $\beta$, enable the AI deblocking network to balance the importance of the LIDAR loss and the range/intensity losses, ensuring comprehensive optimization of the network during the training stages. In some implementations, diverse data augmentation techniques may be used to enhance the variety of training data. For example, techniques such as random rotations, translations, and scaling may be implemented on the training dataset. In an embodiment, model optimization is performed using MSE loss and Adam optimizer with a learning rate initially set to 1×10−4 and decreased by a factor of 2 at epochs 100, 200, and 250, with a total of 300 epochs. In an implementation, the batch size is set to 32×32×64 (width×height×depth) with each batch containing 8 point clouds.

Both branches first pass through a point cloud unpooling layer 211, 221 which implements a point cloud unpooling process on the input data. Point cloud unpooling is a process used in 3D data processing to reconstruct a high-resolution point cloud from a low-resolution point cloud by upsampling and interpolating the points. The process can involve the following steps: low-resolution input, point upsampling, interpolation, and enhancement. The input to the point cloud unpooling algorithm is a low-resolution point cloud (i.e., decompressed, quantized LIDAR range/intensity data). This point cloud is typically obtained by downsampling a higher-resolution point cloud, such as during the encoding process executed by encoder 110. Point cloud unpooling aims to estimate the original high-resolution point positions and attributes by upsampling and interpolating the low-resolution points. The unpooling process may involve performing interpolation techniques, such as nearest-neighbor, linear, or more sophisticated methods like Gaussian process regression or spline interpolation, to estimate the missing point values and generate a higher-resolution point cloud. Additionally, the unpooling layer may also consider the local geometry and context of the points to enhance the upsampled point cloud and preserve important features.

The output of the unshuffling layers 211, 221 may be fed into a series of layers which can include one or more convolutional layers and one or more parametric rectified linear unit (PReLU) layers. A legend is depicted for both FIG. 2A and FIG. 2B which indicates the cross hatched block represents a convolutional layer and the dashed block represents a PReLU layer. Convolution is the first layer to extract features from an input image. Convolution preserves the relationship between pixels by learning image features using small squares of input data. It is a mathematical operation that takes two inputs such as an image matrix and a filter or kernel. The embodiment features a cascaded ResNet-like structure comprising 8 ResBlocks to effectively process the input data. The filter size associated with each convolutional layer may be different. The filter size used for the pixel domain of the top branch may be different than the filter size used for the frequency domain of the bottom branch.

A PReLU layer is an activation function used in neural networks. The PReLU activation function extends the ReLU by introducing a parameter that allows the slope for negative values to be learned during training. The advantage of PReLU over ReLU is that it enables the network to capture more complex patterns and relationships in the data. By allowing a small negative slope for the negative inputs, the PReLU can learn to handle cases where the output should not be zero for all negative values, as is the case with the standard ReLU. In other implementations, other non-linear functions such as tanh or sigmoid can be used instead of PReLU.

After passing through a series of convolutional and PReLU layers, both branches enter the resnet 230 which further comprises more convolutional and PReLU layers.

The frequency domain branch is slightly different than the pixel domain branch once inside ResNet 230, specifically the frequency domain is processed by a transposed convolutional (TConv) layer 231. Transposed convolutions are a type of operation used in neural networks for tasks like image generation, image segmentation, and upsampling. They are used to increase the spatial resolution of feature maps while maintaining the learned relationships between features. Transposed convolutions aim to increase spatial dimensions of feature maps, effectively "upsampling" them. This is typically done by inserting zeros (or other values) between existing values to create more space for new values.

Inside ResBlock 230 the data associated with the pixel and frequency domains are combined back into a single stream by using the output of the Tconv 231 and the output of the top branch. The combined data may be used as input for a channel-wise transformer 300. In some embodiments, the channel-wise transformer may be implemented as a multi-scale attention block utilizing the attention mechanism. For more detailed information about the architecture and functionality of channel-wise transformer 300 refer to FIG. 3. The output of channel-wise transformer 300 may be a bit stream suitable for reconstructing the original LIDAR image. FIG. 2B shows the output of ResBlock 230 is passed through a final convolutional layer before being processed by a pixel shuffle layer 240 which can perform upsampling on the data prior to image reconstruction. The output of the AI deblocking network may be passed through a quantizer 124 for dequantization prior to producing a reconstructed LIDAR image 250.

Figure 3:
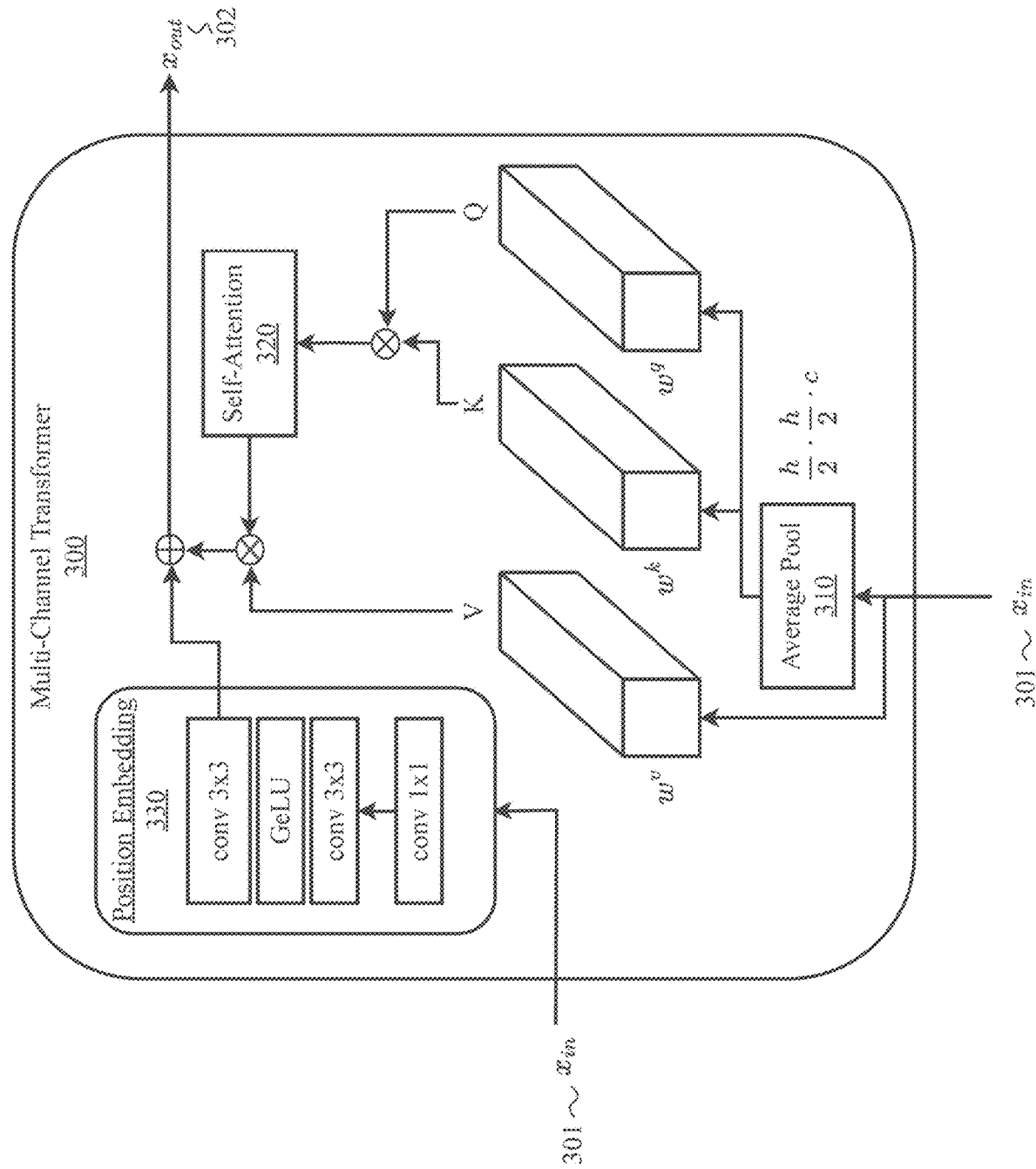
FIG. 3 is a block diagram illustrating an exemplary architecture for a component of the system for LIDAR image compression, the channel-wise transformer.

FIG. 3 is a block diagram illustrating an exemplary architecture for a component of the system for LIDAR image compression, the channel-wise transformer 300. According to the embodiment, channel-wise transformer receives an input signal, $x_{in}$ 301, the input signal comprising LIDAR data which is being processed by AI deblocking network 123. The input signal may be copied and follow two paths through multi-channel transformer 300.

A first path may process input data through a position embedding module 330 comprising series of convolutional layers as well as a Gaussian Error Linear Unit (GeLU). In traditional recurrent neural networks or convolutional neural networks, the order of input elements is inherently encoded through the sequential or spatial nature of these architectures. However, in transformer-based models, where the attention mechanism allows for non-sequential relationships between tokens, the order of tokens needs to be explicitly conveyed to the model. Position embedding module 330 may represent a feedforward neural network (position-wise feedforward layers) configured to add position embeddings to the input data to convey the spatial location or arrangement of pixels in an image. The output of position embedding module 330 may be added to the output of the other processing path the received input signal is processed through.

A second path may process the input data. It may first be processed via a channel-wise configuration and then through a self-attention layer 320. The signal may be copied/duplicated such that a copy of the received signal is passed through an average pool layer 310 which can perform a downsampling operation on the input signal. It may be used to reduce the spatial dimensions (e.g., width and height) of feature maps while retaining the most important information. Average pooling functions by dividing the input feature map into non-overlapping rectangular or square regions (often referred to as pooling windows or filters) and replacing each region with the average of the values within that region. This functions to downsample the input by summarizing the information within each pooling window.

Self-attention layer 320 may be configured to provide attention to AI deblocking network 123. The self-attention mechanism, also known as intra-attention or scaled dot-product attention, is a fundamental building block used in various deep learning models, particularly in transformer-based models. It plays a crucial role in capturing contextual relationships between different elements in a set of data, making it highly effective for tasks involving structured data like LIDAR range/intensity channels. Self-attention layer 320 allows each element in the input set to consider other elements and weigh their importance based on their relevance to the current element. This enables the model to capture dependencies between elements regardless of their spatial distance, which is a limitation in traditional convolutional models like CNNs The input 301 and downsampled input sequence is transformed into three different representations: Query (Q), Key (K), and Value (V). These transformations ($w^V$ $w^K$, and $w^Q$) are typically linear projections of the original input. For each element in the sequence, the dot product between its Query and the Keys of all other elements is computed. The dot products are scaled by a factor to control the magnitude of the attention scores. The resulting scores may be normalized using a softmax function to get attention weights that represent the importance of each element to the current element. The Values (V) of all elements are combined using the attention weights as coefficients. This produces a weighted sum, where elements with higher attention weights contribute more to the final representation of the current element. The weighted sum is the output of the self-attention mechanism for the current element. This output captures contextual information from the entire input sequence.

The output of the two paths (i.e., position embedding module 330 and self-attention layer 320) may be combined into a single output data stream $x_{out}$ 302.

Figure 4:
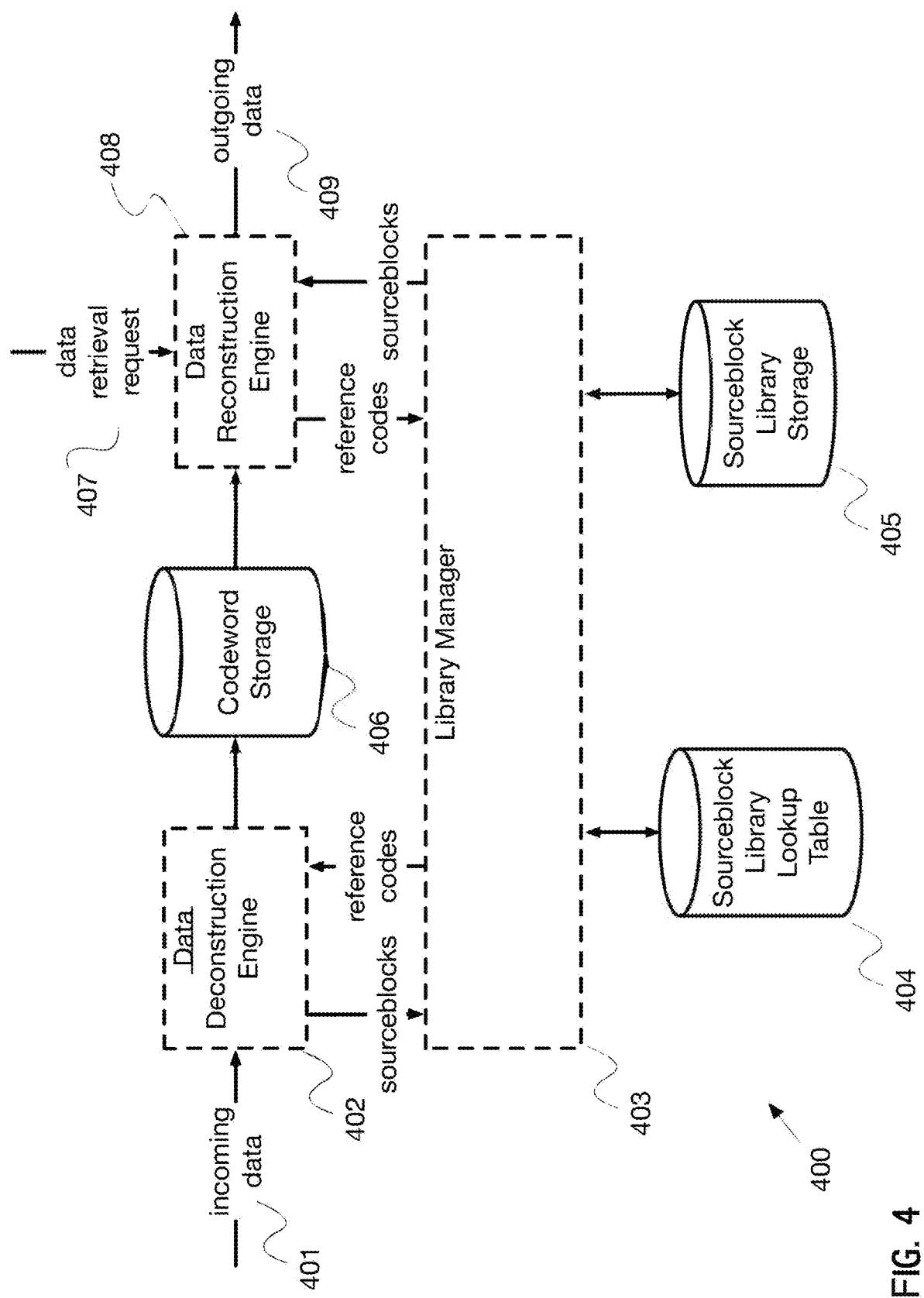
FIG. 4 is a block diagram illustrating an exemplary system architecture for providing lossless data compaction, according to an embodiment.

FIG. 4 is a block diagram illustrating an exemplary system architecture 400 for providing lossless data compaction, according to an embodiment. As incoming data 401 is received by data deconstruction engine 402. Data deconstruction engine 402 breaks the incoming data into sourceblocks, which are then sent to library manager 403. Using the information contained in sourceblock library lookup table 404 and sourceblock library storage 405, library manager 403 returns reference codes to data deconstruction engine 402 for processing into codewords, which are stored in codeword storage 106. When a data retrieval request 407 is received, data reconstruction engine 408 obtains the codewords associated with the data from codeword storage 406, and sends them to library manager 403. Library manager 403 returns the appropriate sourceblocks to data reconstruction engine 408, which assembles them into the proper order and sends out the data in its original form 409.

Figure 5:
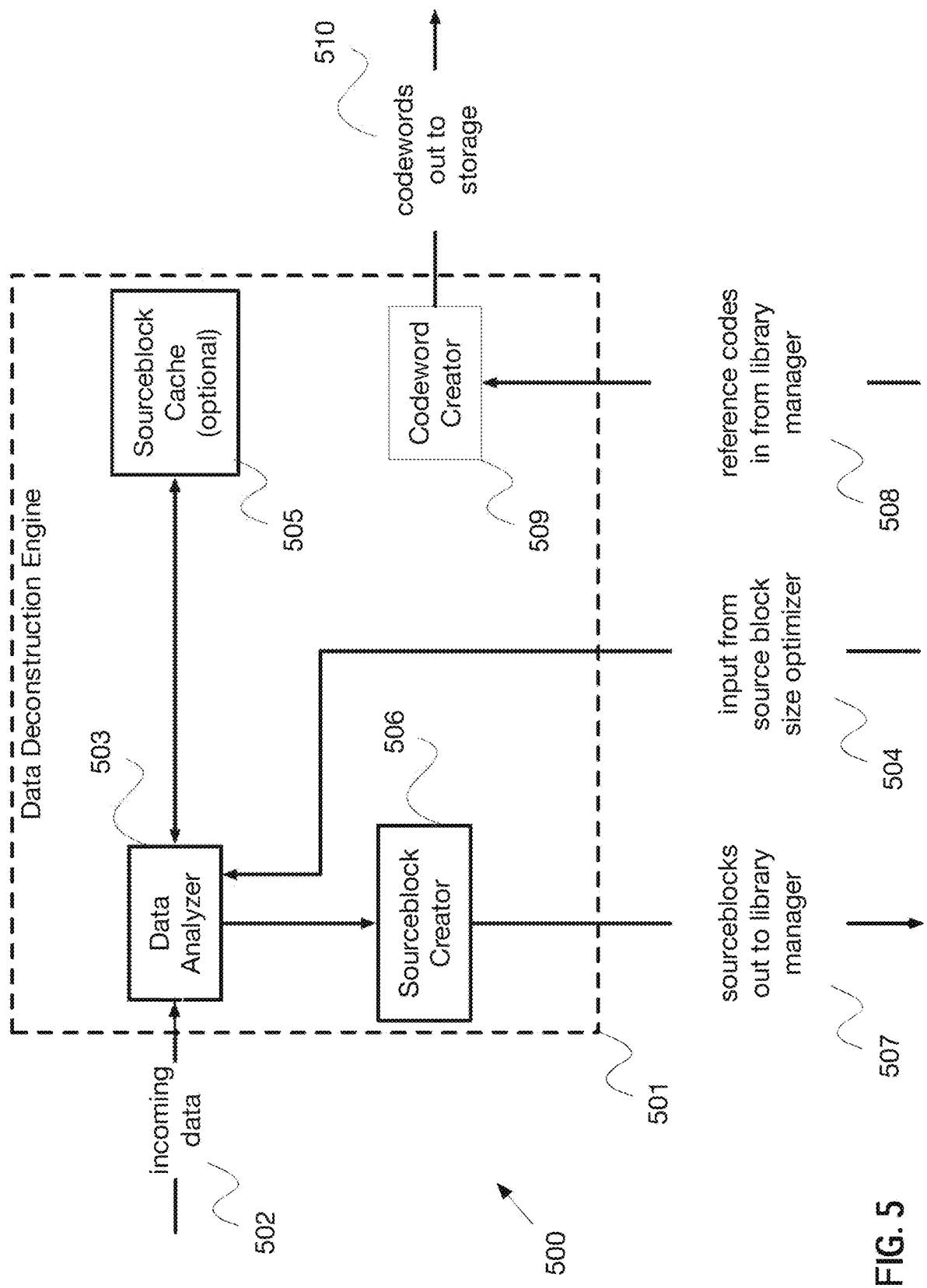
FIG. 5 is a diagram showing an embodiment of one aspect of the lossless data compaction system, specifically data deconstruction engine.

FIG. 5 is a diagram showing an embodiment of one aspect 500 of the system, specifically data deconstruction engine 501. Incoming data 502 is received by data analyzer 503, which optimally analyzes the data based on machine learning algorithms and input 504 from a sourceblock size optimizer, which is disclosed below. Data analyzer may optionally have access to a sourceblock cache 505 of recently processed sourceblocks, which can increase the speed of the system by avoiding processing in library manager 403. Based on information from data analyzer 503, the data is broken into sourceblocks by sourceblock creator 506, which sends sourceblocks 507 to library manager 403 for additional processing. Data deconstruction engine 501 receives reference codes 508 from library manager 403, corresponding to the sourceblocks in the library that match the sourceblocks sent by sourceblock creator 506, and codeword creator 509 processes the reference codes into codewords comprising a reference code to a sourceblock and a location of that sourceblock within the data set. The original data may be discarded, and the codewords representing the data are sent out to storage 510.

Figure 6:
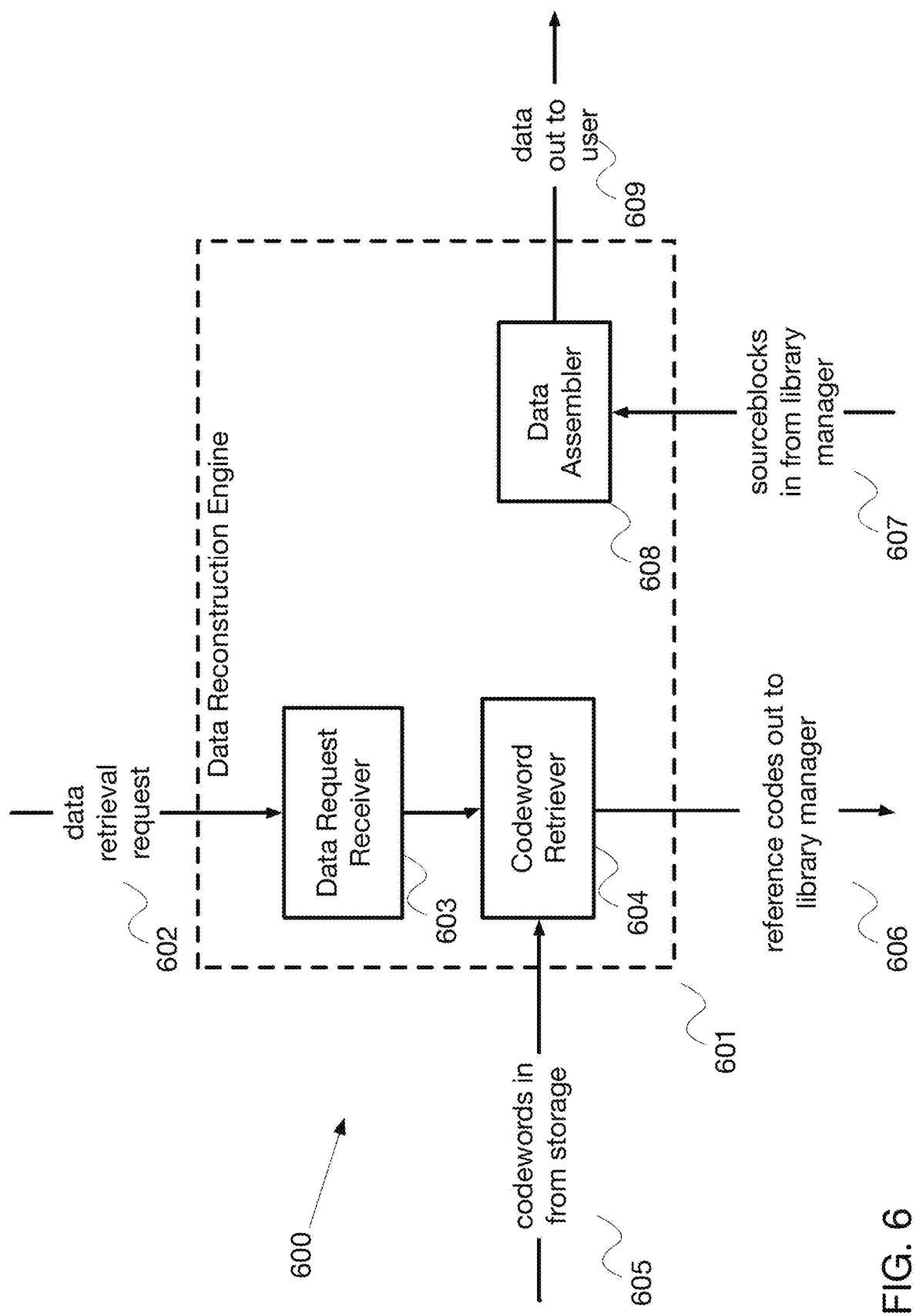
FIG. 6 is a diagram showing an embodiment of another aspect of lossless data compaction system 600, specifically data reconstruction engine.

FIG. 6 is a diagram showing an embodiment of another aspect of system 600, specifically data reconstruction engine 601. When a data retrieval request 602 is received by data request receiver 603 (in the form of a plurality of codewords corresponding to a desired final data set), it passes the information to data retriever 604, which obtains the requested data 605 from storage. Data retriever 604 sends, for each codeword received, a reference codes from the codeword 606 to library manager 403 for retrieval of the specific sourceblock associated with the reference code. Data assembler 608 receives the sourceblock 607 from library manager 403 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 609 in its original form.

Figure 7:
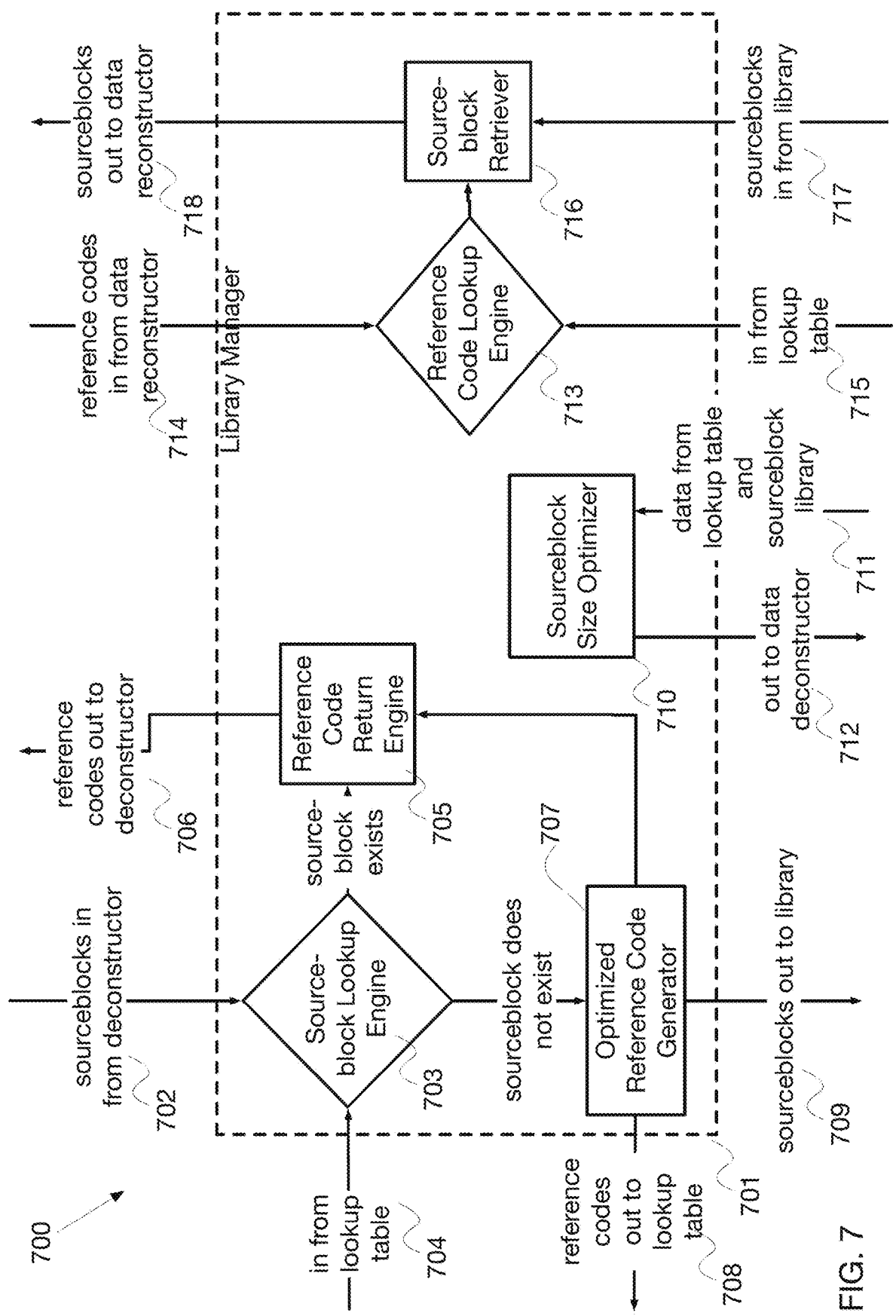
FIG. 7 is a diagram showing an embodiment of another aspect of lossless data compaction the system 700, specifically library manager.

FIG. 7 is a diagram showing an embodiment of another aspect of the system 700, specifically library manager 701. One function of library manager 701 is to generate reference codes from sourceblocks received from data deconstruction engine 701. As sourceblocks are received 702 from data deconstruction engine 501, sourceblock lookup engine 703 checks sourceblock library lookup table 704 to determine whether those sourceblocks already exist in sourceblock library storage 705. If a particular sourceblock exists in sourceblock library storage 105, reference code return engine 705 sends the appropriate reference code 706 to data deconstruction engine 601. If the sourceblock does not exist in sourceblock library storage 105, optimized reference code generator 407 generates a new, optimized reference code based on machine learning algorithms. Optimized reference code generator 707 then saves the reference code 708 to sourceblock library lookup table 704; saves the associated sourceblock 709 to sourceblock library storage 105; and passes the reference code to reference code return engine 705 for sending 706 to data deconstruction engine 501. Another function of library manager 701 is to optimize the size of sourceblocks in the system. Based on information 711 contained in sourceblock library lookup table 404, sourceblock size optimizer 410 dynamically adjusts the size of sourceblocks in the system based on machine learning algorithms and outputs that information 712 to data analyzer 603. Another function of library manager 701 is to return sourceblocks associated with reference codes received from data reconstruction engine 601. As reference codes are received 714 from data reconstruction engine 601, reference code lookup engine 713 checks sourceblock library lookup table 715 to identify the associated sourceblocks; passes that information to sourceblock retriever 716, which obtains the sourceblocks 717 from sourceblock library storage 405; and passes them 718 to data reconstruction engine 601.

Detailed Description of Exemplary Aspects

Figure 8:
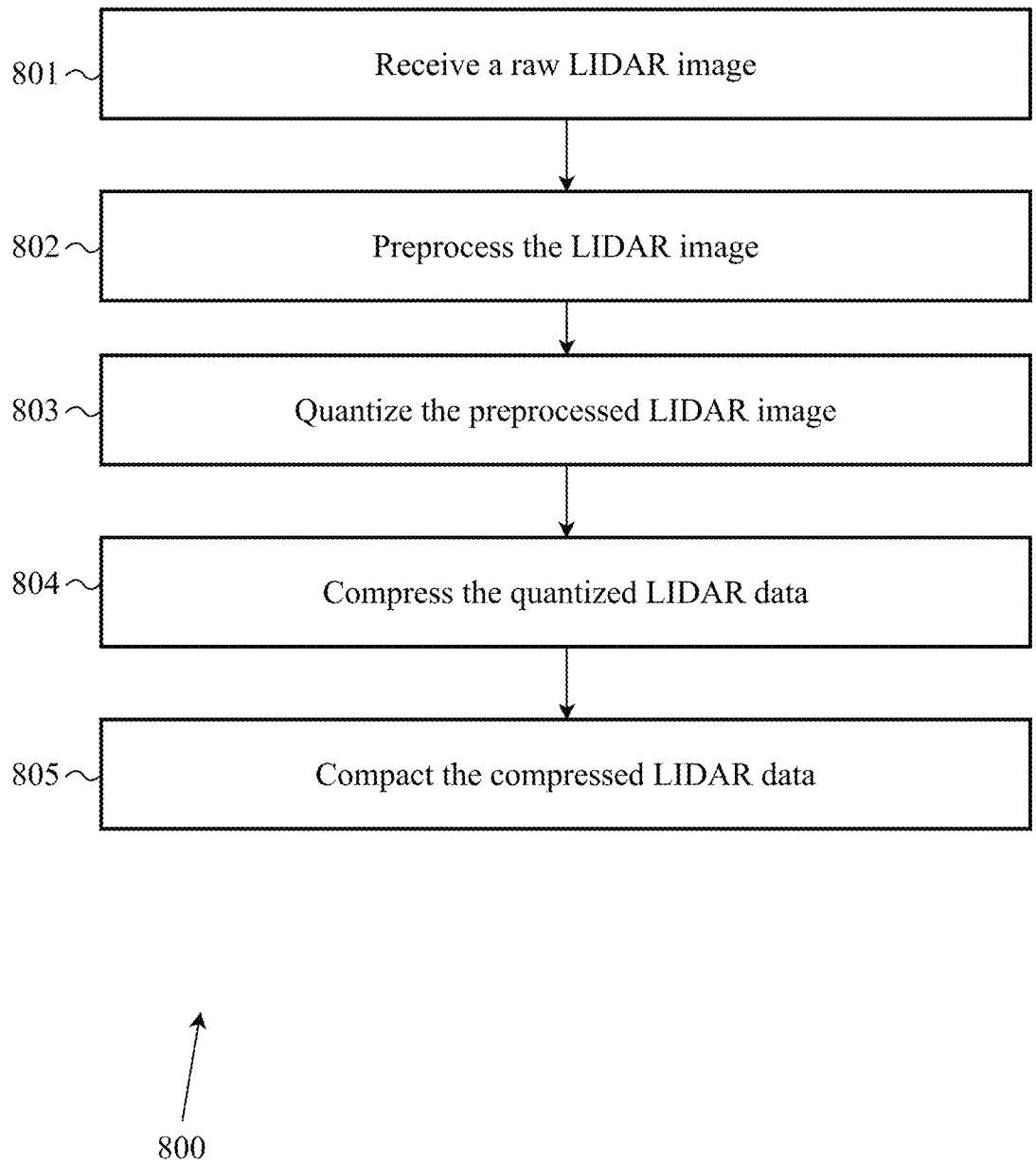
FIG. 8 is a flow diagram illustrating an exemplary method for LIDAR image compression, according to an embodiment.

FIG. 8 is a flow diagram illustrating an exemplary method 800 for single-channel LIDAR image compression, according to an embodiment. According to the embodiment, the process begins at step 801 when encoder 110 receives a raw LIDAR point cloud. The LIDAR point cloud comprises both range and intensity information for each point. In some embodiments, the range and intensity components may be processed as separate channels. At step 802, the received LIDAR data may be preprocessed for further processing by encoder 110. For example, the input data may be clipped, normalized, or otherwise transformed in order to facilitate further processing. As a next step 803, the preprocessed data may be passed to quantizer 112 which quantizes the data. The next step 804, comprises compressing the quantized LIDAR data using a compression algorithm known to those with skill in the art. In an embodiment, the compression algorithm may comprise a point cloud compression technique, such as octree-based compression or geometry-based compression, for both compression and decompression of LIDAR data. As a last step 805, the compressed data may be compacted. The compaction may be a lossless compaction technique, such as those described with reference to FIGS. 4-7. The output of method 800 is a compressed, compacted bit stream of LIDAR image data which can be stored in a database, requiring much less storage space than would be required to store the original, raw LIDAR point cloud. The compressed and compacted bit stream may be transmitted to an endpoint for storage or processing. Transmission of the compressed and compacted data requires less bandwidth and computing resources than transmitting raw LIDAR image data.

Figure 9:
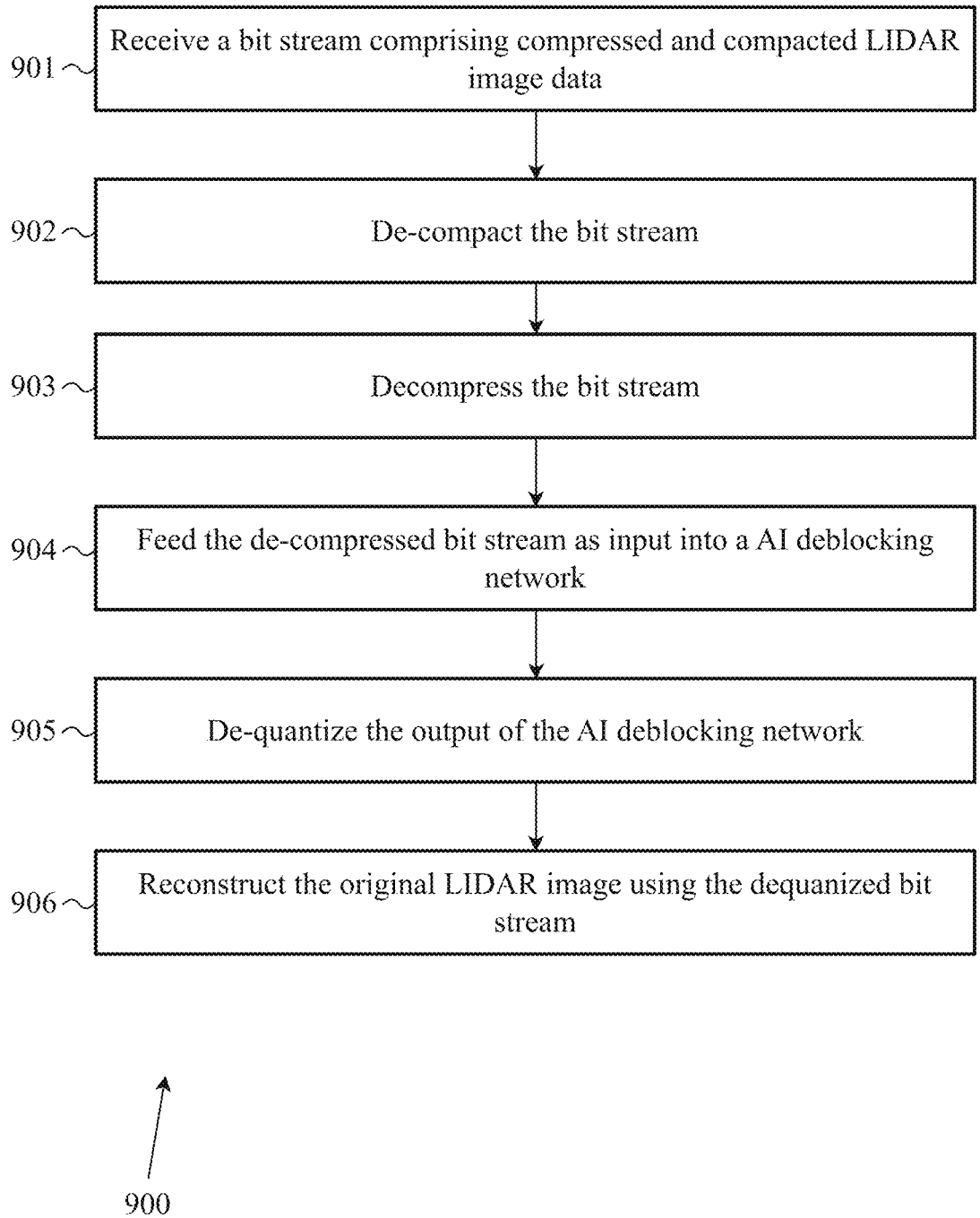
FIG. 9 is a flow diagram illustrating and exemplary method for decompression of a LIDAR image, according to an embodiment.

FIG. 9 is a flow diagram illustrating an exemplary method 900 for decompression of a single-channel LIDAR image, according to an embodiment. According to the embodiment, the process begins at step 901 when decoder 120 receives a bit stream comprising compressed and compacted LIDAR image data. The compressed bit stream may be received from encoder 110 or from a suitable data storage device. At step 902, the received bit stream is first de-compacted to produce an encoded (compressed) bit stream. In some embodiments, data reconstruction engine 601 may be implemented as a system for de-compacting a received bit stream. The next step 903, comprises decompressing the de-compacted bit stream using a suitable point cloud decompression algorithm known to those with skill in the art, such as octree-based decompression or geometry-based decompression. At step 904, the decompressed LIDAR data may be fed as input into AI deblocking network 123 for point cloud enhancement via a trained deep learning network. The AI deblocking network may utilize a series of 3D convolutional layers and/or 3D ResBlocks to process the input data and perform artifact removal on the decompressed LIDAR point cloud. AI deblocking network may be further configured to implement an attention mechanism for the model to capture dependencies between points regardless of their spatial distance. In an embodiment, during training of AI deblocking network, the range loss and intensity loss in conjunction with the LIDAR loss may be computed and accounted for, further boosting the compression performance of system 100. The output of AI deblocking network 123 can be sent to a quantizer 124 which can execute step 905 by de-quantizing the output bit stream from AI deblocking network. As a last step 906, the system can reconstruct the original LIDAR point cloud using the de-quantized bit stream.

Figure 10:
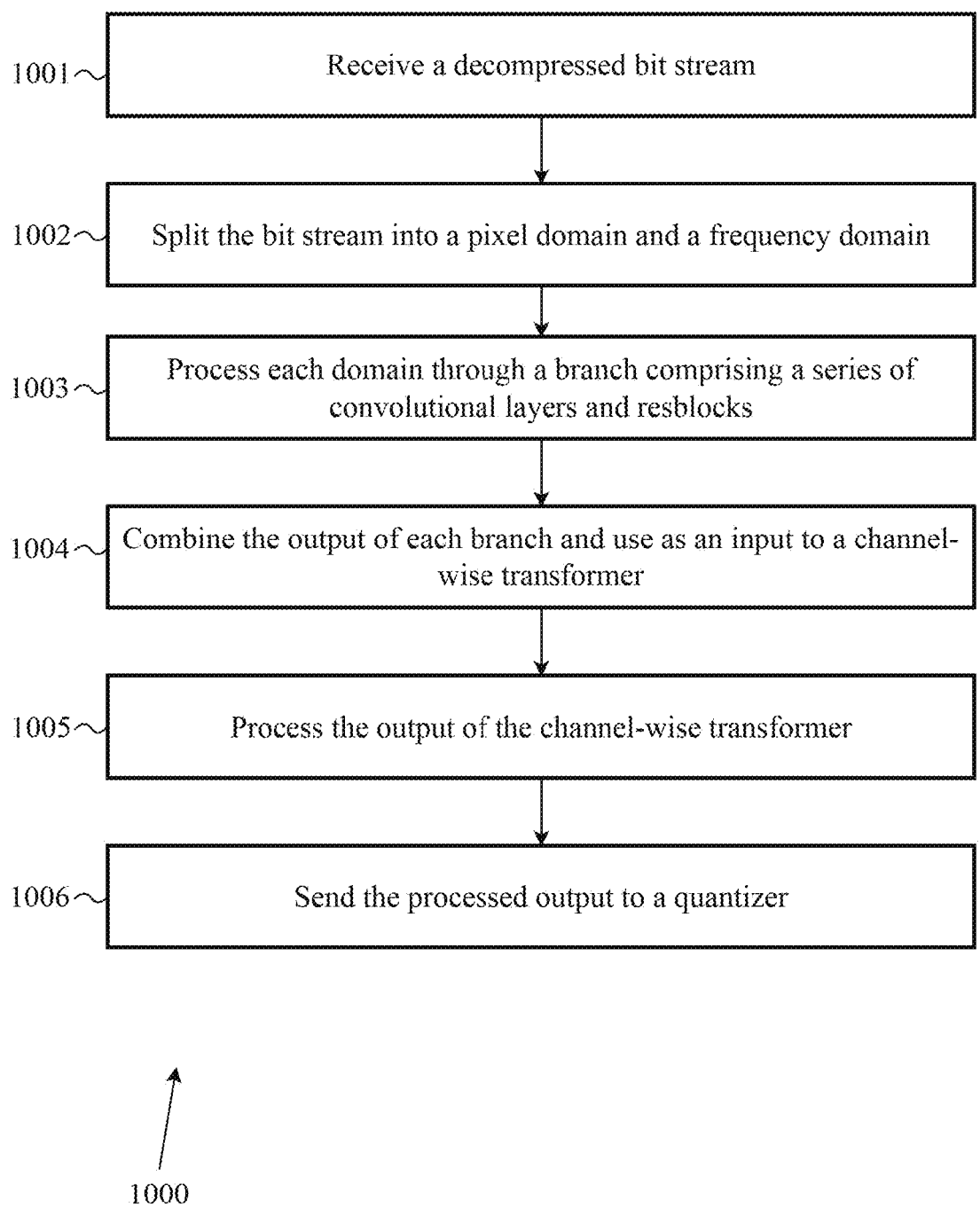
FIG. 10 is a flow diagram illustrating an exemplary method for deblocking using a trained deep learning algorithm, according to an embodiment.

FIG. 10 is a flow diagram illustrating an exemplary method for deblocking using a trained deep learning algorithm, according to an embodiment. According to the embodiment, the process begins at step 1001 wherein the trained deep learning algorithm (i.e., AI deblocking network 123) receives a decompressed bit stream comprising LIDAR image data. At step 1002, the bit stream is split into a pixel domain and a frequency domain. Each domain may pass through AI deblocking network, but have separate, almost similar processing paths. As a next step 1003, each domain is processed through its respective branch, the branch comprising a series of convolutional layers and ResBlocks. In some implementations, frequency domain may be further processed by a transpose convolution layer. The two branches are combined and used as input for a multi-channel transformer with attention mechanism at step 1004. Multi-channel transformer 300 may perform functions such as downsampling, positional embedding, and various transformations, according to some embodiments. Multi-channel transformer 300 may comprise one or more of the following components: channel-wise attention, transformer self-attention, and/or feedforward layers. In an implementation, the downsampling may be performed via average pooling. As a next step 1005, the AI deblocking network processes the output of the channel-wise transformer. The processing may include the steps of passing the output through one or more convolutional or PReLU layers and/or upsampling the output. As a last step 1006, the processed output may be forwarded to quantizer 124 or some other endpoint for storage or further processing.

Figure 11A:
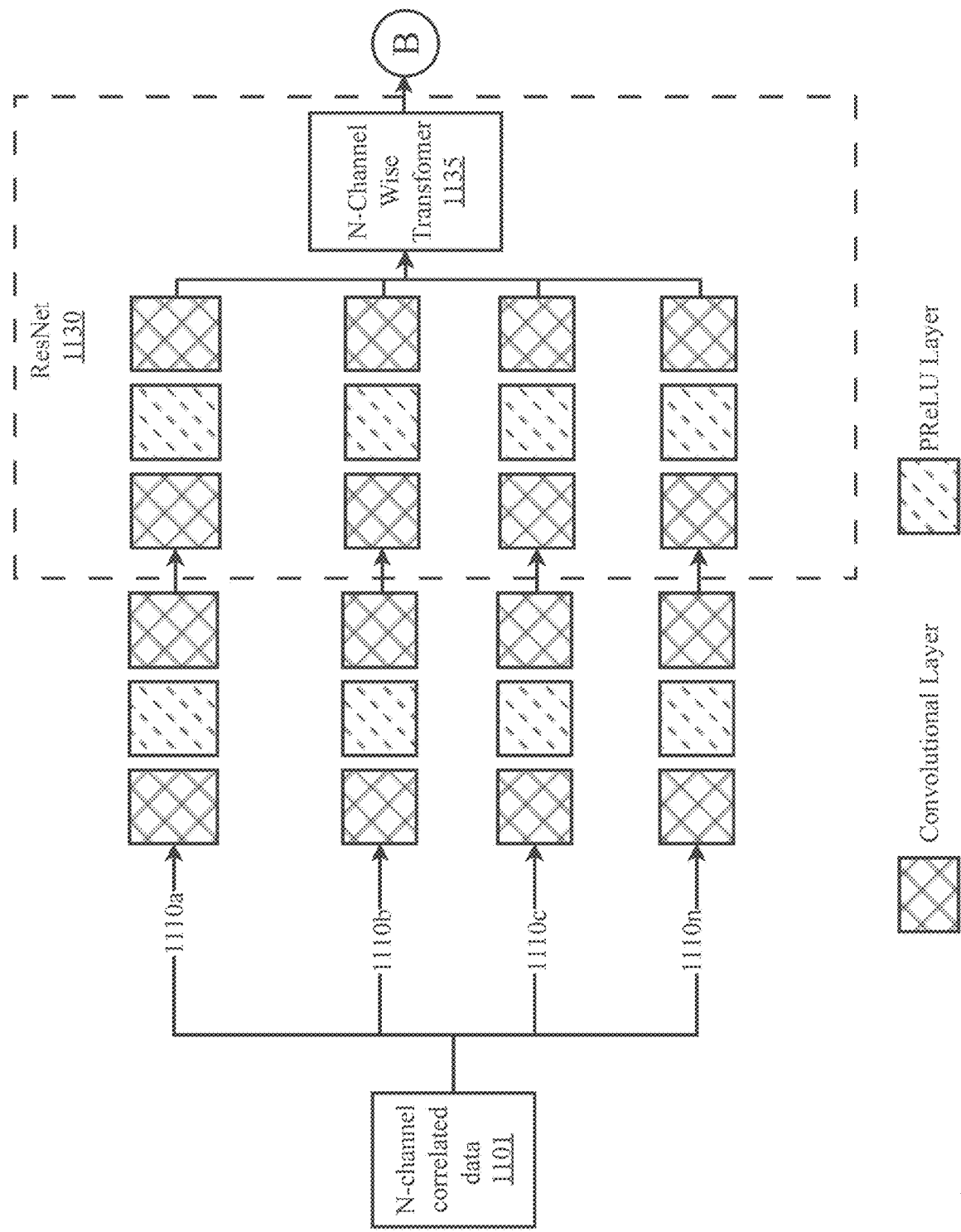
FIGS. 11A and 11B illustrate an exemplary architecture for an AI deblocking network configured to provide deblocking for a general N-channel data stream, according to an embodiment.
Figure 11B:
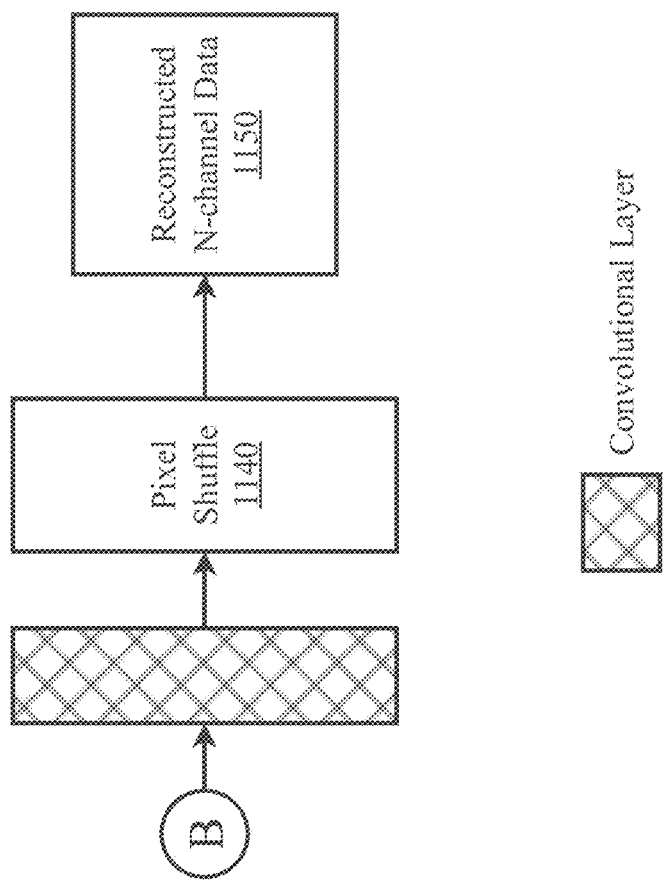

FIGS. 11A and 11B illustrate an exemplary architecture for an AI deblocking network configured to provide deblocking for a general N-channel data stream, according to an embodiment. The term "N-channel" refers to data that is composed of multiple distinct channels of modalities, where each channel represents a different aspect of type of information. These channels can exist in various forms, such as sensor readings, image color channels, or data streams, and they are often used together to provide a more comprehensive understanding of the underlying phenomenon. Examples of N-channel data include, but is not limited to, RGB images (e.g., in digital images, the red, green, and blue channels represent different color information; combining these channels allows for the representation of a wide range of colors), medical imaging (e.g., may include Magnetic Resonance Imaging scans with multiple channels representing different tissue properties, or Computed Tomography scans with channels for various types of X-ray attenuation), audio data (e.g., stereo or multi-channel audio recordings where each channel corresponds to a different microphone or audio source), radar and LIDAR (e.g., in autonomous vehicles, radar and lidar sensors provide multi-channel data, with each channel capturing information about objects' positions, distances, and reflectivity) SAR image data, text data (e.g., in natural language processing, N-channel data might involve multiple sources of text, such as social media posts and news articles, each treated as a separate channel to capture different textual contexts), sensor networks (e.g., environmental monitoring systems often employ sensor networks with multiple sensors measuring various parameters like temperature, humidity, air quality, and more. Each sensor represents a channel), climate data, financial data, and social network data.

The disclosed AI deblocking network may be trained to process any type of N-channel data, if the N-channel data has a degree of correlation. More correlation between and among the multiple channels yields a more robust and accurate AI deblocking network capable of performing high quality compression artifact removal on the N-channel data stream. A high degree of correlation implies a strong relationship between channels. Using SAR image data has been used herein as an exemplary use case for an AI deblocking network for a N-channel data stream comprising 2 channels, the In-phase and Quadrature components (i.e., I and Q, respectively).

Exemplary data correlations that can be exploited in various implementations of AI deblocking network can include, but are not limited to, spatial correlation, temporal correlation, cross-sectional correlation (e.g., This occurs when different variables measured at the same point in time are related to each other), longitudinal correlation, categorical correlation, rank correlation, time-space correlation, functional correlation, and frequency domain correlation, to name a few.

As shown, an N-channel AI deblocking network may comprise a plurality of branches 1110a-n. The number of branches is determined by the number of channels associated with the data stream. Each branch may initially be processed by a series of convolutional and PReLU layers. Each branch may be processed by resnet 1130 wherein each branch is combined back into a single data stream before being input to N-channel wise transformer 1135, which may be a specific configuration of transformer 300. The output of N-channel wise transformer 1135 may be sent through a final convolutional layer before passing through a last pixel shuffle layer 1140. The output of AI deblocking network for N-channel video/image data is the reconstructed N-channel data 1150.

As an exemplary use case, video/image data may be processed as a 3-channel data stream comprising Green (G), Red (R), and Blue (B) channels. An AI deblocking network may be trained that provides compression artifact removal of video/image data. Such a network would comprise 3 branches, wherein each branch is configured to process one of the three channels (R, G, or B). For example, branch 1110a may correspond to the R-channel, branch 1110b to the G-channel, and branch 1110c to the B-channel. Each of these channels may be processed separately via their respective branches before being combined back together inside resnet 1130 prior to being processed by N-channel wise transformer 1135.

As another exemplary use case, a sensor network comprising a half dozen sensors may be processed as a 6-channel data stream. The exemplary sensor network may include various types of sensors collecting different types of, but still correlated, data. For example, sensor network can include a pressure sensor, a thermal sensor, a barometer, a wind speed sensor, a humidity sensor, and an air quality sensor. These sensors may be correlated to one another in at least one way. For example, the six sensors in the sensor network may be correlated both temporally and spatially, wherein each sensor provides a time series data stream which can be processed by one of the 6 channels 1110a-n of AI deblocking network. As long as AI deblocking network is trained on N-channel data with a high degree of correlation and which is representative of the N-channel data it will encounter during model deployment, it can reconstruct the original data using the methods described herein.

Figure 12:
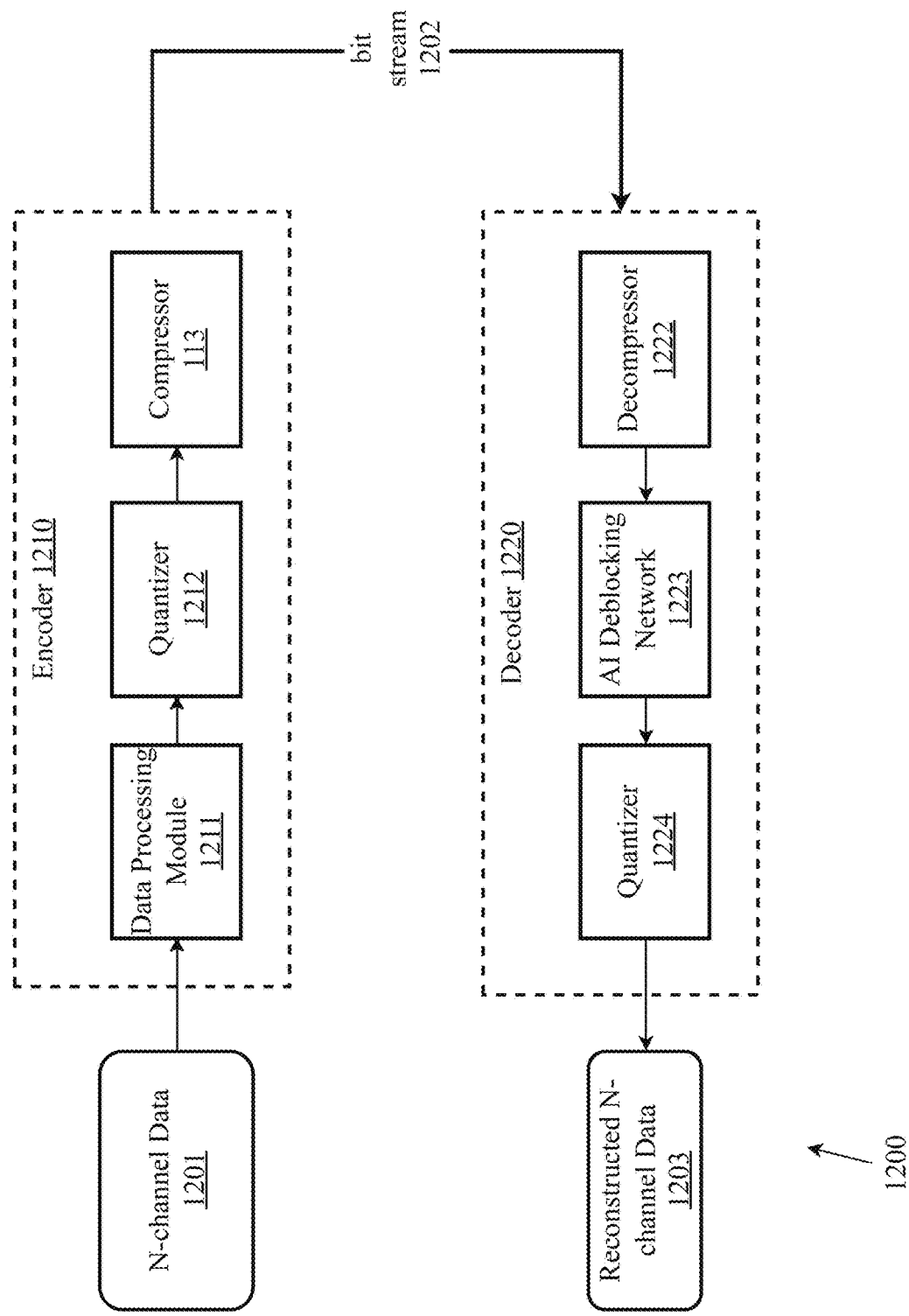
FIG. 12 is a block diagram illustrating an exemplary system architecture for N-channel data compression with predictive recovery, according to an embodiment.

FIG. 12 is a block diagram illustrating an exemplary system architecture 1200 for N-channel data compression with predictive recovery, according to an embodiment. According to the embodiment, the system 1200 comprises an encoder module 1210 configured to receive as input N-channel data 1201 and compress and compact the input data into a bitstream 102, and a decoder module 120 configured to receive and decompress the bitstream 1202 to output a reconstructed N-channel data 1203.

A data processor module 1211 may be present and configured to apply one or more data processing techniques to the raw input data to prepare the data for further processing by encoder 1210. Data processing techniques can include (but are not limited to) any one or more of data cleaning, data transformation, encoding, dimensionality reduction, data slitting, and/or the like.

After data processing, a quantizer 1212 performs uniform quantization on the n-number of channels. Quantization is a process used in various fields, including signal processing, data compression, and digital image processing, to represent continuous or analog data using a discrete set of values. It involves mapping a range of values to a smaller set of discrete values. Quantization is commonly employed to reduce the storage requirements or computational complexity of digital data while maintaining an acceptable level of fidelity or accuracy. Compressor 1213 may be configured to perform data compression on quantized N-channel data using a suitable conventional compression algorithm.

The resulting encoded bitstream may then be (optionally) input into a lossless compactor (not shown) which can apply data compaction techniques on the received encoded bitstream. An exemplary lossless data compaction system which may be integrated in an embodiment of system 1200 is illustrated with reference to FIG. 4-7. For example, lossless compactor may utilize an embodiment of data deconstruction engine 501 and library manager 403 to perform data compaction on the encoded bitstream. The output of the compactor is a compacted bitstream 1202 which can be stored in a database, requiring much less space than would have been necessary to store the raw N-channel data, or it can be transmitted to some other endpoint.

At the endpoint which receives the transmitted compacted bitstream 1202 may be decoder module 1220 configured to restore the compacted data into the original LIDAR image by essentially reversing the process conducted at encoder module 1210. The received bitstream may first be (optionally) passed through a lossless compactor which de-compacts the data into an encoded bitstream. In an embodiment, a data reconstruction engine 601 may be implemented to restore the compacted bitstream into its encoded format. The encoded bitstream may flow from compactor to decompressor 1222 wherein a data compaction technique may be used to decompress the encoded bitstream into the range/intensity channels. It should be appreciated that lossless compactor components are optional components of the system, and may or may not be present in the system, dependent upon the embodiment.

According to the embodiment, an Artificial Intelligence (AI) deblocking network 1223 is present and configured to utilize a trained deep learning network to provide compression artifact removal as part of the decoding process. AI deblocking network 1223 may leverage the relationship demonstrated between the various N-channels of a data stream to enhance the reconstructed N-channel data 1203. Effectively, AI deblocking network 1223 provides an improved and novel method for removing compression artifacts that occur during lossy compression/decompression using a network designed during the training process to simultaneously address the removal of artifacts and maintain fidelity of the original N-channel data signal, ensuring a comprehensive optimization of the network during the training stages.

The output of AI deblocking network 1223 may be dequantized by quantizer 1224, restoring the n-channels to their initial dynamic range. The dequantized n-channel data may be reconstructed and output 1203 by decoder module 1220 or stored in a database.

Figure 13:
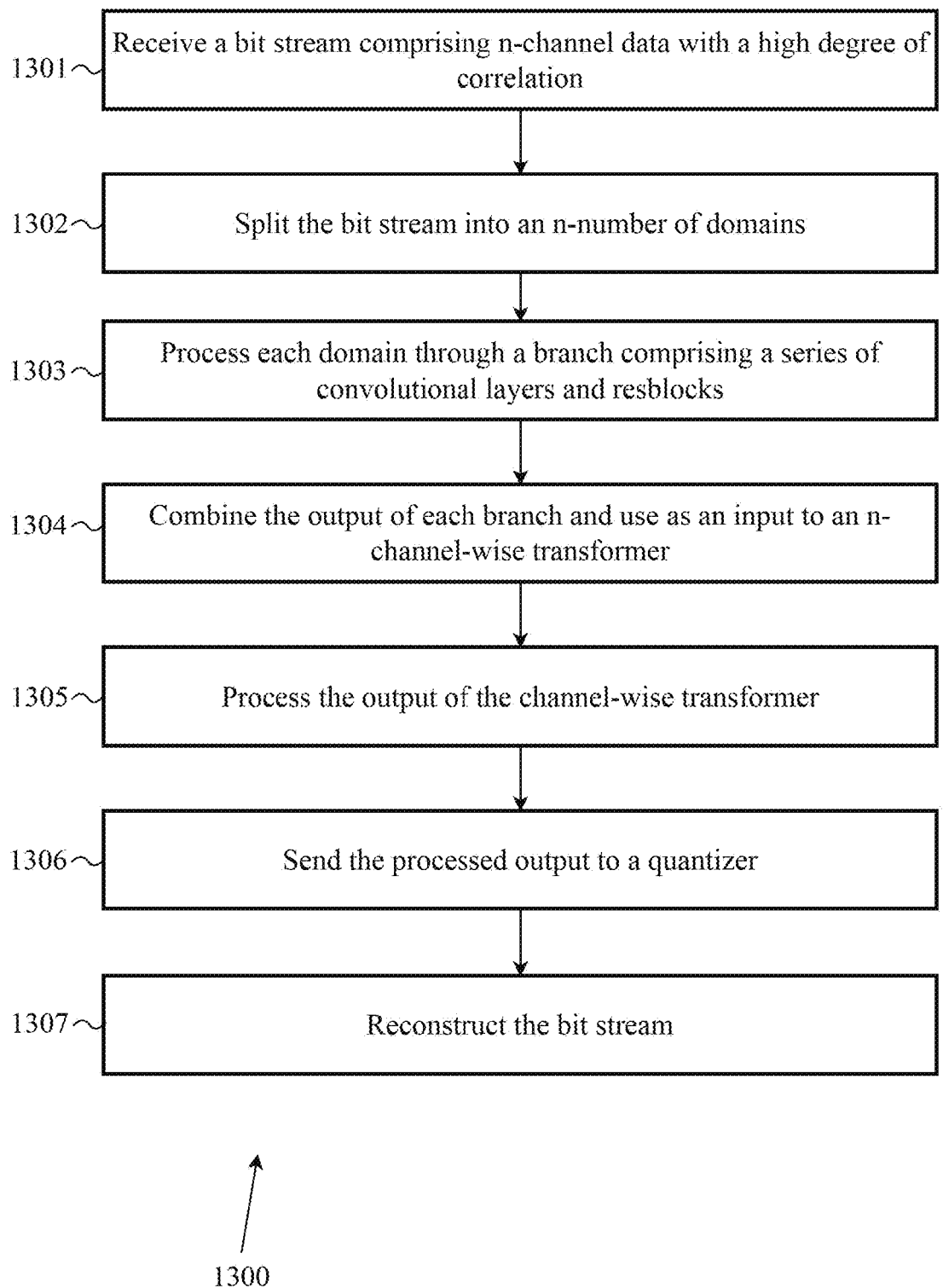
FIG. 13 is a flow diagram illustrating an exemplary method for processing a compressed n-channel bit stream using an AI deblocking network, according to an embodiment.

FIG. 13 is a flow diagram illustrating an exemplary method for processing a compressed n-channel bit stream using an AI deblocking network, according to an embodiment. According to the embodiment, the process begins at step 1301 when a decoder module 1220 receives, retrieves, or otherwise obtains a bit stream comprising n-channel data with a high degree of correlation. At step 1302, the bit stream is split into an n-number of domains. For example, if the received bit stream comprises image data in the form of R-, G,- and B-channels, then the bit stream would be split into 3 domains, one for each color (RGB). At step 1303, each domain is processed through a branch comprising a series of convolutional layers and ResBlocks. The number of layers and composition of said layers may depend upon the embodiment and the n-channel data being processed. At step 1304, the output of each branch is combined back into a single bitstream and used as an input into an n-channel wise transformer 1135. At step 1305, the output of the channel-wise transformer may be processed through one or more convolutional layers and/or transformation layers, according to various implementations. At step 1306, the processed output may be sent to a quantizer for upscaling and other data processing tasks. As a last step 1307, the bit stream may be reconstructed into its original uncompressed form.

Exemplary Computing Environment

Figure 14:
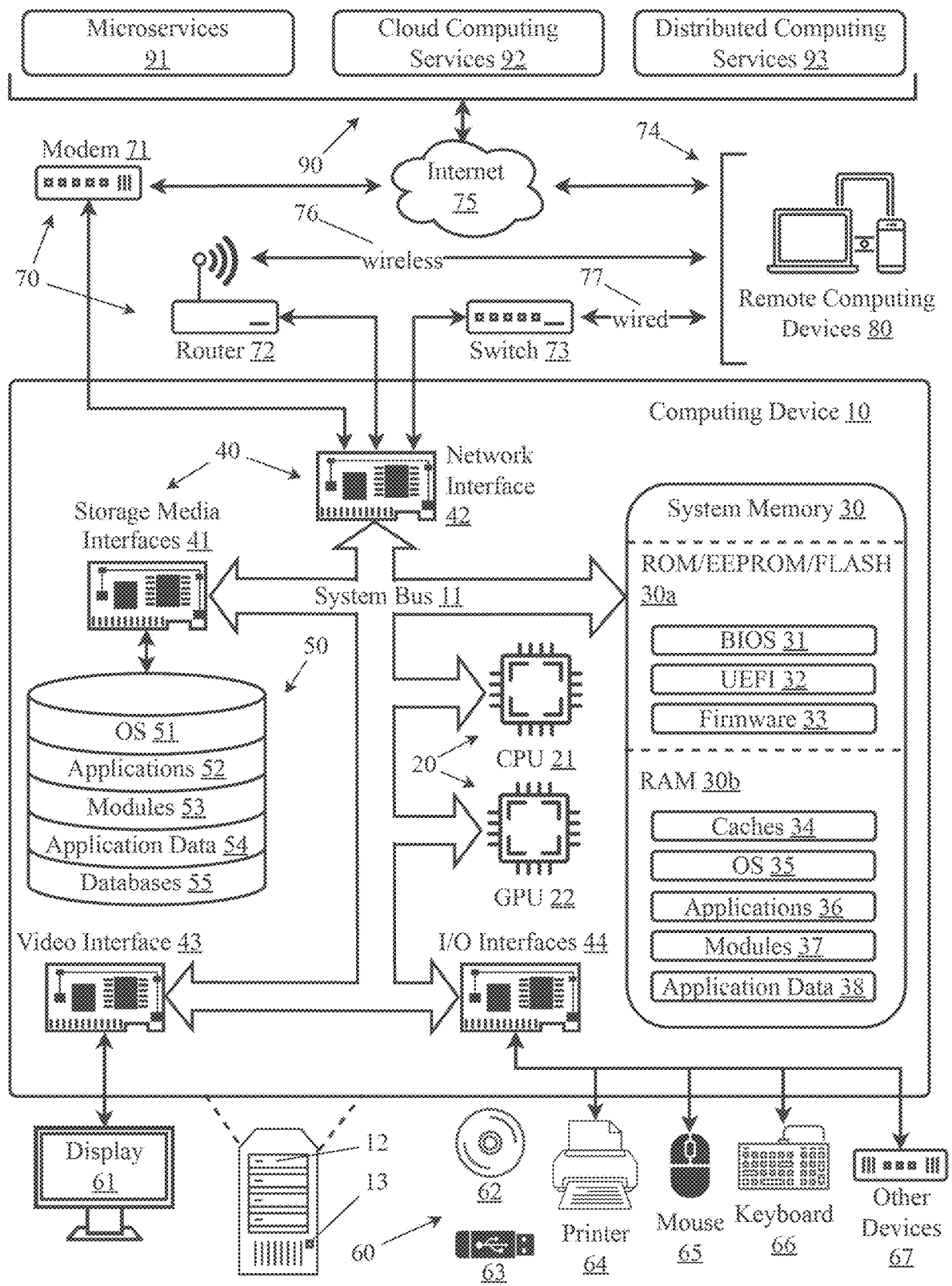
FIG. 14 illustrates an exemplary computing environment on which an embodiment described herein may be implemented, in full or in part.

FIG. 14 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed, or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

What is claimed is:

1. A system for upsampling of decompressed data after lossy compression using a neural network, comprising:
   a trained deep learning algorithm configured to recover range and intensity information associated with a LIDAR image; and
   a decoder comprising a first plurality of programming instructions stored in the memory and operable on the processor, wherein the first plurality of programming instructions, when operating on the processor, cause the computing device to:
      receive a compressed bit stream, the compressed bit stream comprising single-channel LIDAR image data;
      decode the compressed bit stream to predict both a range channel and an intensity channel; and
      use both the range channel and the intensity channel as inputs into the trained deep learning algorithm to recover both phase and amplitude information associated with the LIDAR image data.

2. The system of claim 1, wherein the trained deep learning algorithm is a neural network that can recover signals from a compressed bitstream.

3. The system of claim 2, wherein the trained deep learning algorithm further comprises a multi-channel transformer with attention.

4. The system of claim 1, wherein training the deep learning algorithm comprises two stages, wherein each stage comprises a specific loss function.

5. The system of claim 4, wherein the loss function is mean squared error.

6. The system of claim 4, wherein one stage of the two stages is associated with a loss function for the range and intensity channels.

7. The system of claim 4, wherein one stage of the two stages is associated with the range loss and intensity loss.

8. A method for upsampling of decompressed data after lossy compression using a neural network, comprising the steps of:
   training a deep learning algorithm configured to recover range and intensity information associated with a LIDAR image;
   receiving a compressed bit stream, the compressed bit stream comprising single-channel LIDAR image data;
   decoding the compressed bit stream to predict both a range channel and an intensity channel; and
   using both the range channel and the intensity channel as inputs into the trained deep learning algorithm to recover both range and intensity information associated with the LIDAR image data.

9. The method of claim 8, wherein the trained deep learning algorithm is a neural network that can recover signals from a compressed bitstream.

10. The method of claim 9, wherein the trained deep learning algorithm further comprises a multi-channel transformer with attention.

11. The method of claim 8, wherein training the deep learning algorithm comprises two stages, wherein each stage comprises a specific loss function.

12. The method of claim 11, wherein the loss function is mean squared error.

13. The method of claim 11, wherein one stage of the two stages is associated with a loss function for the range and intensity channels.

14. The method of claim 11, wherein one stage of the two stages is associated with the range loss and intensity loss.

* * * * *